(12) United States Patent
Matsuoka

(10) Patent No.: US 6,626,759 B1
(45) Date of Patent: Sep. 30, 2003

(54) GAME APPARATUS, METHOD FOR DISPLAYING MOTION OF CHARACTER, AND COMPUTER READABLE RECORDING MEDIUM FOR RECORDING PROGRAM USED TO DISPLAY MOTION OF CHARACTER

(75) Inventor: Hideki Matsuoka, Osaka (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 60 days.

(21) Appl. No.: 09/605,849

(22) Filed: Jun. 29, 2000

(30) Foreign Application Priority Data

Jun. 5, 2000 (JP) ........................................ 2000-168313

(51) Int. Cl.[7] .............................................. A63F 13/00
(52) U.S. Cl. .......................................... 463/31; 345/474
(58) Field of Search ............................ 463/1, 7, 8, 30, 463/31, 32, 37, 43, 44; 345/156, 418, 419, 420, 473, 474, 475

(56) References Cited

U.S. PATENT DOCUMENTS 6,011,562 A * 1/2000 Gagne et al. ............... 345/473
6,088,042 A * 7/2000 Handelman et al. ........ 345/473
6,162,120 A * 12/2000 Takahashi et al. ............. 463/8
6,322,448 B1 * 11/2001 Kaku et al. .................. 463/32

FOREIGN PATENT DOCUMENTS

WO              97/46295         12/1997

* cited by examiner

*Primary Examiner*—Kim Nguyen
(74) *Attorney, Agent, or Firm*—Greenblum & Bernstein, P.L.C.

(57) ABSTRACT

A computer program is recorded on a computer readable recording medium. The computer program is used to correct motion of characters instructed by a game player, while considering a physique difference between the characters. The computer program causes a computer to: determine motion in order that a predetermined portion of the first character is moved toward a predetermined portion of a standard mode model in response to an operation input made by a player, while the standard mode model corresponds with a second character and the standard mode model is constituted by portions having a correspondence relationship with the respective portions of the second character; to acquire a positional relationship between a preselected portion of the standard mode model, which is a target of the determined motion, and a portion of the second character corresponding to the preselected portion of the standard mode model; to correct the determined motion by employing the acquired positional relation; and also to display on a screen, the first character which is moved in accordance with the corrected motion.

24 Claims, 18 Drawing Sheets

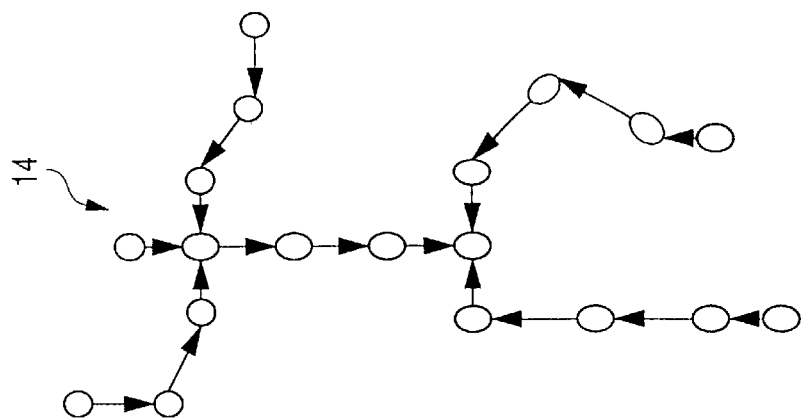
FIG. 6D
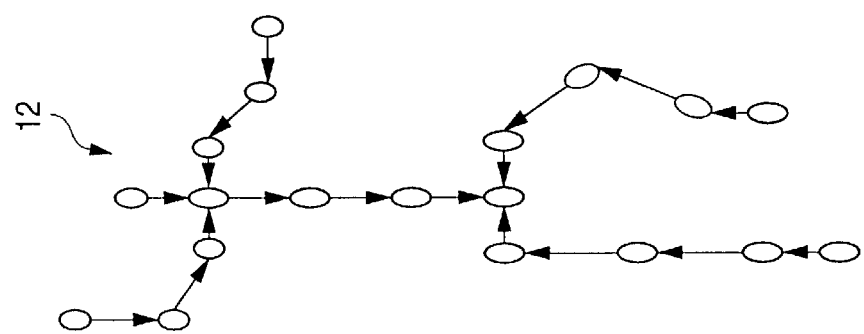
FIG. 6C
FIG. 6B
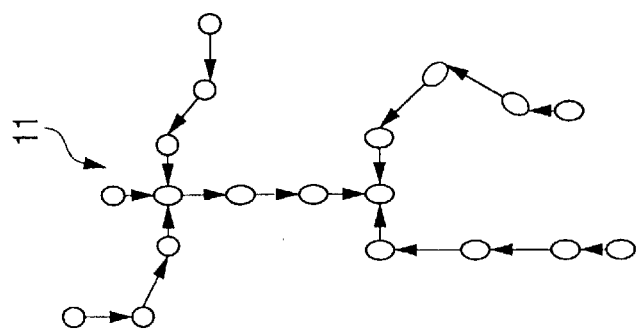
FIG. 6A

GAME APPARATUS, METHOD FOR DISPLAYING MOTION OF CHARACTER, AND COMPUTER READABLE RECORDING MEDIUM FOR RECORDING PROGRAM USED TO DISPLAY MOTION OF CHARACTER

The present disclosure relates to subject matter contained in Japanese Patent Application No. 2000-168313, filed on Jun. 5, 2000, the disclosure of which is expressly incorporated herein by reference in its entirety.

BACKGROUND OF THE INVENTION

1. Field of the Invention

The present invention generally relates to a technique capable of displaying motion of characters in video games. More specifically, the present invention is directed to a game apparatus, a method for displaying motion of characters in connection with bodily shapes of these characters in video games, and further, directed to a computer readable recording medium for recording thereon a computer program used to display motion of these characters.

2. Description of the Related Art

In fighting games and the like, a plurality of techniques are prepared in order that an own character operated by a game player attacks an enemy character. For instance, such a technique is prepared that a hand and a foot of an own character hits a specific portion (attacking target position) of an enemy character, e.g., a chest of this enemy character. When such a technique is designated by receiving an operation input of a game player, the own character is operated in accordance with predetermined motion in order to give an attack to the attacking target position of the enemy character. There is no change in the motion of the own character unless the relative positional relationship between the enemy character and the own character is continuously changed. However, there are many possibilities that the relative positional relationship between the enemy character and the own character is not always constant.

As a consequence, the technique capable of changing the motion of the own character in response to the relative positional relationship between the enemy character and the own character is disclosed in, for example, PCT WO 97/46295 publication. This publication describes such a technique that when there is a height difference between two characters, a strike made from one character located at a lower position may be transferred toward a higher direction, while this height difference is corrected.

As is known from wrestling games among fighting games, there is such a game that while displaying characters which simulate actual wrestlers, these characters functioning as actual wrestlers may fight with each other. In such a wrestling game, realistic fighting scenes can be represented by making the sizes of the character models coincident with the physique of the actual wrestlers. However, in such a case that the sizes of the respective characters are different from each other, there are differences in the relative positional relationships between the attacking characters and the attacked characters, depending upon the fighting counter parties. The above-described WO 97/46295 publication does not consider the sizes, or dimensions of the characters. Under such a circumstance, such a novel technique is desired by which the respective characters may be moved in motion designed by considering bodily shapes of the individual characters.

SUMMARY OF THE INVENTION

The present invention has therefore an object to provide a technique capable of moving characters in natural motion which is established by considering bodily shapes of the respective characters.

A method for displaying motion of a first character in a virtual space, according to a first aspect of the present invention, is featured by such a display method comprising the steps of: determining motion in order that a predetermined portion of the first character is moved toward a predetermined portion of a standard mode model in response to an operation input made by a player, while the standard mode model is made in correspondence with a second character and the standard mode model is constituted by portions having a correspondence relationship with the respective portions of the second character; acquiring a positional relationship between a preselected portion of the standard mode model, which is a target of the determined motion, and a portion of the second character corresponding to the preselected portion of the standard mode model; correcting the determined motion by employing the acquired positional relation; and also displaying on a screen, the first character which is moved in accordance with the corrected motion.

It should be noted that while the above-described motion is corrected, a position of a predetermined portion of the first character may be gradually corrected until a correction amount of the position of the predetermined portion of the first character becomes such an amount defined in response to the acquired positional relationship.

A method for displaying motion of a first character in a virtual space, according to a second aspect of the present invention, is featured by such a display method comprising the steps of: determining motion in order that a predetermined portion of a first standard mode model (e.g., base skeleton model in one embodiment) is made in contact with a predetermined portion of a second standard mode model in response to an operation input made by a player, while the first standard mode model is defined in correspondence with the first character and also has the same attitude as that of the first character; and the second standard mode model is defined in correspondence with the character and also has the same attitude as that of a second character; acquiring a relative positional relationship between the predetermined portion of the second standard mode model and a predetermined portion corresponding thereto in the second character; correcting the determined motion by using the acquired relative positional relationship; and also displaying a scene where motion is carried out by causing the first character to execute the corrected motion in order that a preselected portion of the first character, which corresponds to the predetermined portion of the first standard mode model, is made in contact with a preselected portion of the second character, which corresponds to the predetermined portion of the second standard mode model.

As previously explained while both the first standard mode model corresponding to the first character equal to the own character, and also the second standard mode model corresponding to the second character equal to the enemy character are prepared, the motion between the first and second standard mode models is determined. This motion between the first and second standard mode models is corrected by employing the relative positional relationship between the predetermined portion of the second standard model and the preselected portion corresponding thereto in said second character, which indicates the physique difference between the second character and the second standard mode model. As a result, the first character equal to the second character can apply a proper attack to the second character. In other words, such motion is carried out in order that the predetermined portion of the first character is made in contact with the predetermined portion of the second character.

It should also be noted that both the first standard mode model and the second standard mode model are equal to a first standard-sized skeleton model and a second standard-sized skeleton model; the predetermined portion of the second standard mode model is equal to such a position obtained by internally dividing a preselected bone in the second skeleton model by a predetermined ratio; and the predetermined portion of the second character, which corresponds to the predetermined portion of the second standard mode model, is equal to such a position obtained by internally dividing a bone in the second character, which is identical to the predetermined bone of the second skeleton model by the same predetermined ratio as that of the second skeleton model. As a consequence, for instance, a predetermined portion of another character which is attacked is located at the same position as the body in the second standard mode model.

Also, the correction of the determined motion is carried out by executing an inverse kinematics process operation in such a manner that the position of the predetermined portion of the first standard mode model is changed based upon the acquired relative positional relationship, and the predetermined portion of the first character is arranged to the changed position. Since the inverse kinematics process operation is carried out, the information such as the angle of the bone in the skeleton model can be simply calculated.

Also, the correction of the determined motion is carried out by executing an inverse kinematics process operation in such a manner that the position of the predetermined portion of the first standard mode model is corrected every interpolation frame based upon the acquired relative positional relationship by an interpolation ratio of the interpolation frame, and the predetermined portion of the first character is arranged to the corrected position. This inverse kinematics process operation may indicate such a process operation in the case that the specific motion is corrected in the plural frames.

Furthermore, motion data used to make the predetermined portion of the first standard mode model in contact with the predetermined portion of the second standard mode model are previously prepared in correspondence with each of the motion; and when the motion is determined, the motion data corresponding thereto is acquired. The motion data by the standard mode model may be used in the various characters.

A professional wrestling game processing method for controlling motion of wrestlers, according to a third aspect of the present invention, is featured by such a game processing method comprising the steps of: displaying such a motion that a first wrestler grasps a predetermined portion of a second wrestler, while judging a shift amount between a reach point of a position of a hand owned by the first wrestler in the grasping motion and the predetermined portion of the second wrestler in response to data indicative of physique which is previously defined in correspondence with the second wrestler; correcting the position of the hand owned by the first wrestler in the grasping motion in response to the judged shift amount; and displaying such a grasping operation that the first wrestler grasps the predetermined portion of the second wrestler based upon the corrected motion.

The methods, according to the first to third aspects of the present invention, may be formed in the form of a computer program capable of executing this method by a computer. In this case, the above-described modification with respect to the second aspect may be similarly applied to this computer program. The program, according to the present invention, is stored in either a recording medium or a storage apparatus, for instance, a CD-ROM (Compact Disk-Read-Only Memory), a DVD (Digital Versatile Disk), a floppy disk, a memory cartridge, a memory, and a hard disk. The computer program stored in either the recording medium or the storage apparatus is read out by a computer, so that the below-mentioned game apparatus may be realized. Also, the program according to the present invention, which has been stored into such a recording medium, may be readily distributed and/or marketed as a software product. This software program may be provided independently with respect to the game apparatus. Since the program according to the present invention is executed by using hardware such as a computer, the technique of the present invention may be readily realized by operating the hardware such as the computer.

A game apparatus, according to a fourth aspect of the present invention, is featured by such a game apparatus for displaying motion of a first character in a virtual space, comprising: a unit for executing a game in accordance with a program; a memory for storing thereinto a portion of the program, or all portions of the program; and a display screen for displaying thereon a game executed by the unit.

In accordance with the program stored in the memory, the unit: determines motion in order that a predetermined portion of the first character is moved toward a predetermined portion of a standard mode model in response to an operation input made by a player, while the standard mode model is made in correspondence with a second character and the standard mode model is constituted by portions having a correspondence relationship with the respective portions of the second character; acquires a positional relationship between a preselected portion of the standard mode model, which is a target of the determined motion, and a portion of the second character corresponding to the preselected portion of the standard mode model; corrects the determined motion by employing the acquired positional relation; and also displays on a screen, the first character which is moved in accordance with the corrected motion.

It should be noted that while the determined motion is corrected, a position of a predetermined portion of the first character may be gradually corrected until a correction amount of the position of the predetermined portion of the first character becomes such an amount defined in response to the acquired positional relationship.

In a game apparatus according to a fifth aspect of the present invention, a unit for executing a game in accordance with a program, determines motion in order that a predetermined portion of a first standard mode model is made in contact with a predetermined portion of a second standard mode model in response to an operation input made by a player, while the first standard mode model is defined in correspondence with the first character and also has the same attitude as that of the first character; and the second standard mode model is defined in correspondence with the character and also has the same attitude as that of a second character; acquires a relative positional relationship between the predetermined portion of the second standard mode model and a predetermined portion corresponding thereto in the second character; corrects the determined motion by using the acquired relative positional relationship; and also displays a scene where motion is carried out by causing the first character to execute the corrected motion in order that a preselected portion of the first character, which corresponds to the predetermined portion of the first standard mode model, is made in contact with a preselected portion of the second character, which corresponds to the predetermined portion of the second standard mode model.

A modification according to the second aspect of the present invention may be applied to the game apparatus according to the fifth aspect of the present invention.

A professional wrestling game apparatus, according to a sixth aspect of the present invention, is featured by such a game apparatus for controlling motion of wrestlers, comprising: a unit for executing a game in accordance with a program; a memory for storing thereinto a portion of the program, or all portions of the program; and a display screen for displaying thereon a game executed by the unit.

In response to the program stored in the memory, the unit: displays such a motion that a first wrestler grasps a predetermined portion of a second wrestler, while judging a shift amount between a reach point of a position of a hand owned by the first wrestler in the grasping motion and the predetermined portion of the second wrestler in response to data indicative of physique which is previously defined in correspondence with the second wrestler; corrects the position of the hand owned by the first wrestler in the grasping motion in response to the judged shift amount; and displays such a grasping operation that the first wrestler grasps the predetermined portion of the second wrestler based upon the corrected motion.

BRIEF DESCRIPTION OF THE DRAWINGS

For a better understanding of the present invention, reference is made of a detailed description to be read in conjunction with the accompanying drawings, in which:

FIG. 6A, FIG. 6B, FIG. 6C, and FIG. 6D are schematic diagrams for illustratively indicating a scene where motion data is applied to a skeleton model; namely, FIG. 6A is a schematic diagram for illustratively showing a base skeleton model; FIG. 6B is a schematic diagram for illustratively indicating a skeleton model of a tall-type model; FIG. 6C is a schematic diagram for illustratively representing a skeleton model of a small-sized model; FIG. 6D is a schematic diagram for illustratively denoting a skeleton model of a large-sized model;

DETAILED DESCRIPTION OF THE PREFERRED EMBODIMENTS

Referring now to drawings, a description will be made of such an preferred embodiment that the inventive idea of the present invention is applied to a professional wrestling game.

Arrangement of Home-Use Game Machine

Figure 1:
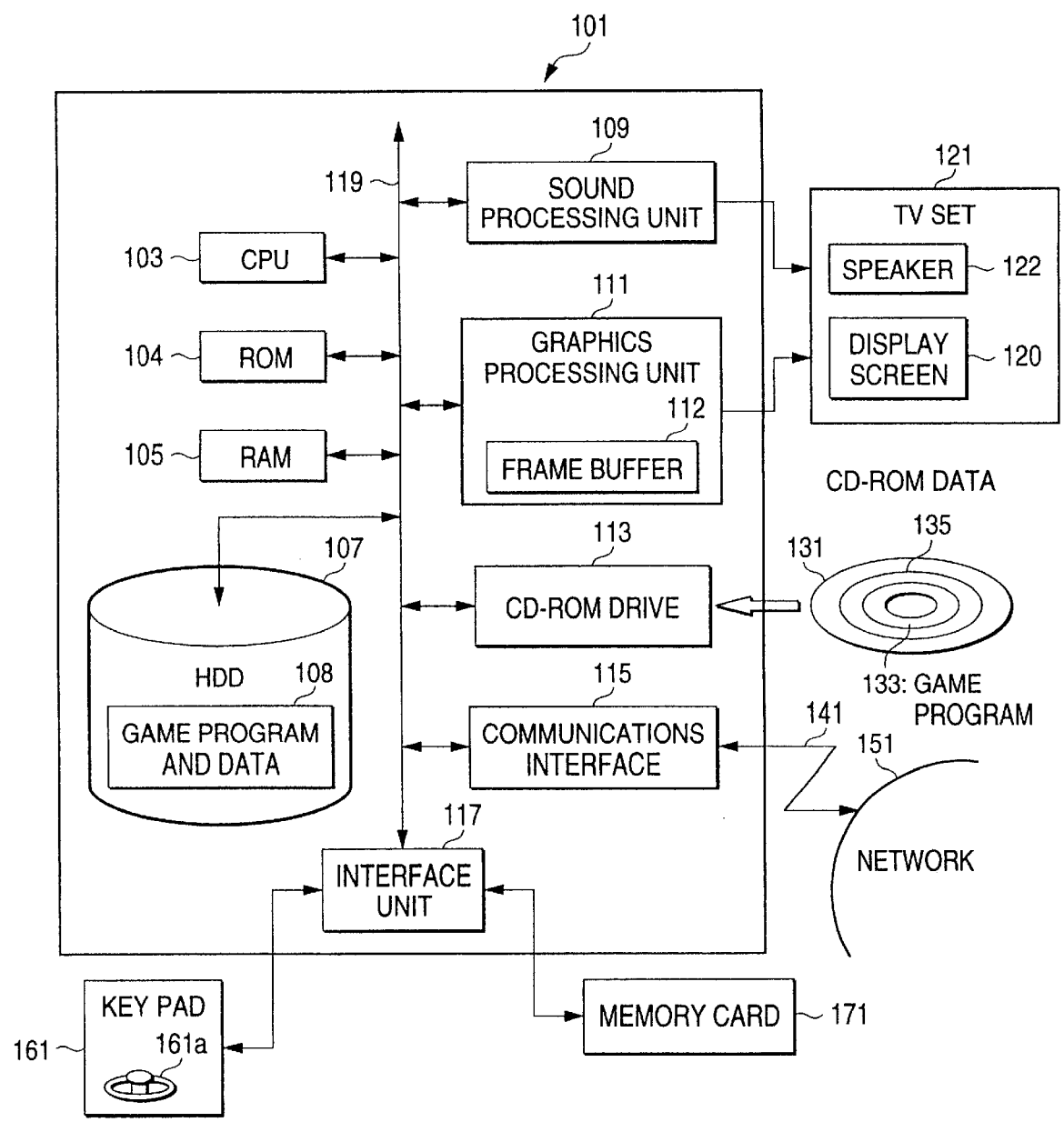
FIG. 1 is a schematic block diagram for representing an arrangement of a typical home-use game machine.

FIG. 1 is a schematic block diagram for schematically representing an arrangement of one typical home-use game machine 101 which executes a computer readable program. That is, a professional wrestling game is realized in the form of the computer program according to this embodiment of the present invention. As represented in this drawing, the home-use game machine 101 is arranged by employing a CPU (Central Processing Unit) 103, a ROM (Read-Only Memory) 104, a RAM (Random Access Memory) 105, an HDD (Hard Disk Drive) 107, a sound processing unit 109, a graphics processing unit 111, a CD-ROM drive 113, a communications interface 115, and an interface unit 117, which are connected to, for example, an internal bus 119. The graphics processing unit 111 is equipped with a frame buffer 112. It should be noted that this frame buffer 112 may be indicated as a VRAM (Video RAM).

Both the sound processing unit 109 and the graphics processing unit 111 employed in the home-use game machine 101 are connected to a TV (Television) set 121 having a display screen 120 and a speaker 122. Also, a CD-ROM (Compact Disk-ROM) 131 is detachably mounted on the CD-ROM drive 113. Both a game program 133 and data 135, according to an embodiment of the present invention, are recorded on this CD-ROM 131. The communications interface unit 115 is connected via a communications medium 141 to a network 151. Both a keypad 161 and a memory card 171 are connected to the interface unit 117. This keypad 161 is provided with a operation button and a joystick 161a.

The CPU 103 executes a computer program stored in the ROM 104, and also the game program 133 recorded on the CD-ROM 131 to control the home-use game machine 101. The RAM 105 functions as a work area of the CPU 103. The HDD 107 functions as a storage area used to save thereinto both the game program 133 and the data 135, which are recorded on, for example, the CD-ROM 131. The memory card functions as a storage area used to save data to which the game program 133 refers. In such a case that the program executed by the CPU 103 instructs to output sound, the sound processing unit 109 interprets this instruction, and then outputs a sound signal to the TV set 121. Then, the sound signal is output as sound from the speaker 122 of the TV set 121.

In response to a graphics instruction issued from the CPU 103, the graphics processing unit 111 produces image data and then writes the produced image data into the frame buffer 112. Then, this graphics processing unit 111 outputs to the TV set 121, such a signal for causing the image data written into the frame buffer 112 to be displayed on the display screen 120. The CD-ROM drive 113 reads out both the game program 133 and the data 135 recorded on the CD-ROM 131.

The communications interface 115 is connected via a communications medium 141 to the network 151 in order to input/output-control a data communication performed between this home-use game machine 101 and another computer, or the like. The interface unit 117 outputs to the RAM 105, an input signal entered from the keypad 161 in response to the operation input made by the joystick 161a. The CPU 103 interprets the content of the operation input based upon the input signal derived form the keypad 161, which is output to the RAM 105. The CPU 103 executes a calculation process operation in response to the operation input.

Both the game program 133 and the data 135, according to this embodiment, are first recorded on, for instance, the CD-ROM 131. Then, when the game is executed, both the game program 133 and the data 135 are read out from the CD-ROM drive 113 to be loaded on the RAM 105. Alternatively, both the game program 133 and the data 135, according to this embodiment, which are recorded on the CD-ROM 131 may be previously read out from the CD-ROM drive 113 and then may be saved in the HDD 107. In the case that both the game program 133 and the data 108, according to this embodiment, are stored in the HDD 107, the game program 133 and the data 108 are loaded form the HDD 107 to the RAM 105.

The CPU 103 processes the game program 133 and the data 135, according to this embodiment, which are loaded on the RAM 105, and then supplies the graphics instruction to the graphics processing unit 111. It should also be noted that intermediately produced data is stored in the RAM 105. The graphics processing unit 111 executes a process operation in response to the graphics instruction issued from the CPU 103, and outputs to the TV set 121, such a signal by which the image data is written into the frame buffer 112, and the image is displayed on the display screen 120.

Algorithm of Game Program

A detailed description will now be made of an exemplary algorithm of a game program related to a professional wrestling game, and also data used in this game program, according to this embodiment, which are executed in such a home-use game machine 101.

Referring now to FIG. 2, FIG. 3, FIG. 4, FIG. 5, FIG. 6, and FIG. 7, the data used in this embodiment will be explained.

Figure 2:
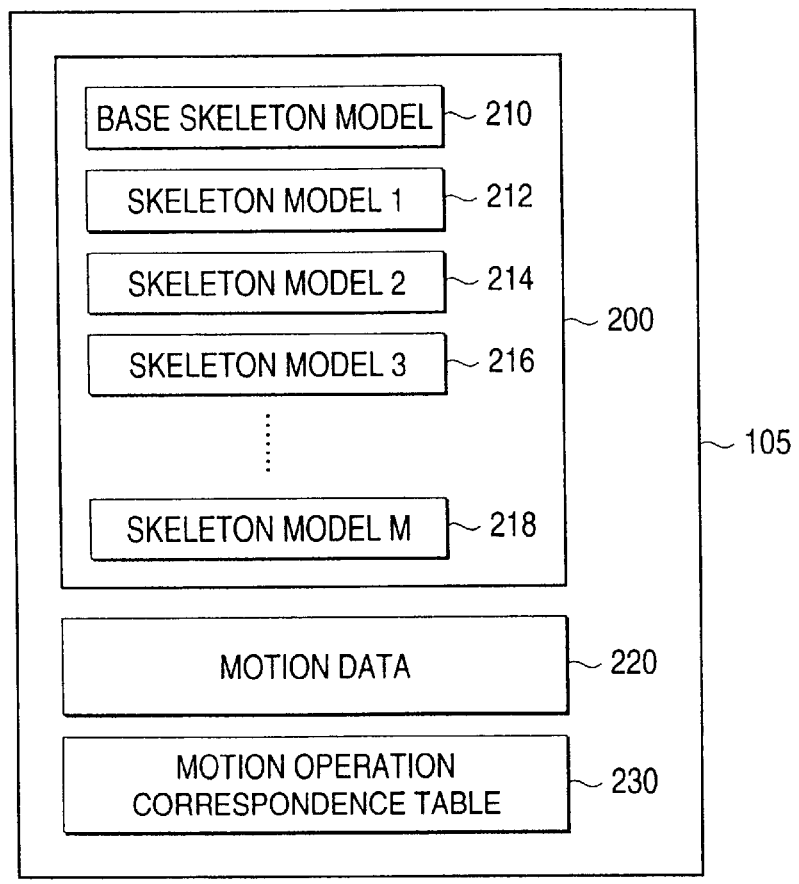
FIG. 2 is a schematic diagram for schematically showing conditions of a RAM employed in the home-use game machine when a computer game program according to the present invention is executed.

FIG. 2 is a schematic diagram for schematically indicating storage conditions of the RAM 105 while the game program 133 according to this embodiment is executed. As indicated in this drawing, the RAM 105 contains model data 200 of the respective characters (wrestlers); motion data 220; and a motion operation correspondence table 230. The motion data 220 is commonly used in the respective characters. The motion operation correspondence table 230 defines a correspondence relationship between a type of motion and the operation of the joystick 161a mounted on, for example, the keypad 161. The model data 200 contains information of a base skeleton model 210, and information of skeleton models 1, 2, 3, - - - , M (symbol "M" being natural number), which are indicated as 212, 214, 216, - - - , 218, respectively. The base skeleton model 210 represents standard physique (constitutions) of wrestlers. The skeleton models 1, 2, 3, - - - , M represent physique of the respective characters.

It should be understood that a base skeleton model is prepared for every character displayed on the display screen 120 of the TV set 121 in this embodiment (will be described more in detail). As a consequence, although only one type of information of the base skeleton model 210 is indicated in FIG. 2, multiple types of information about the base skeleton models 210 are saved in the RAM 105, the total quantity of which is equal to a total number of characters displayed on the display screen 120.

Figure 3:
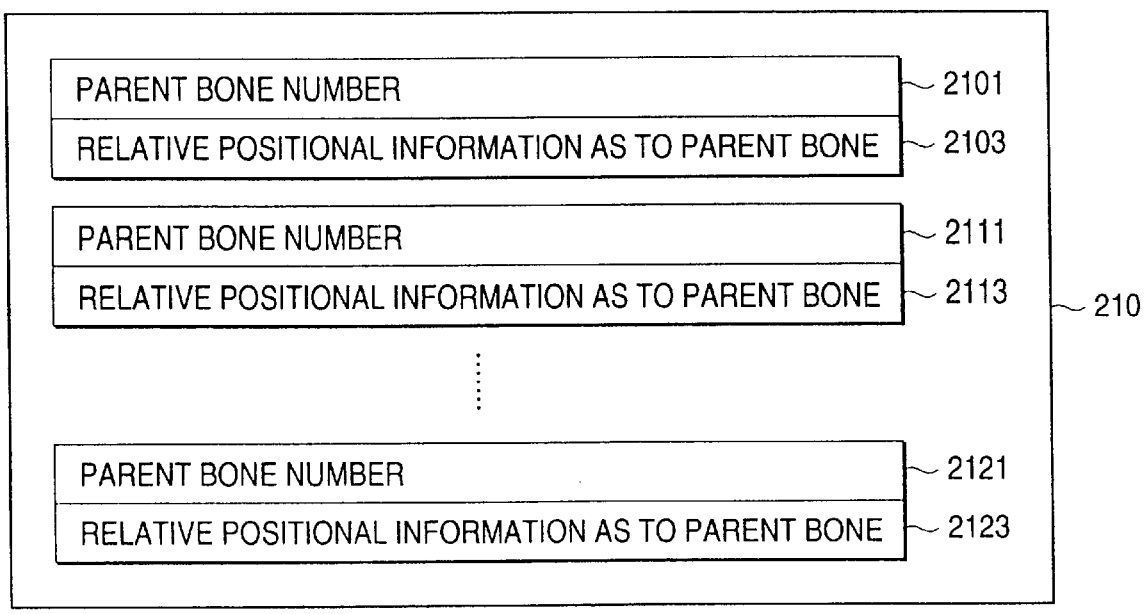
FIG. 3 is a schematic diagram for schematically indicating an example of a data format of a skeleton model stored in the RAM of FIG. 2.

FIG. 3 illustratively shows a data format of a skeleton model in this embodiment. It should also be noted that although FIG. 3 indicates the data format of the base skeleton model 210, skeleton models of other characters have similar data formats to this data format. In this embodiment, as to these skeleton models, a parent/child relationship among bones is defined, while a bone corresponding to, for example, a hipbone is defined as the most significant-graded bone. Accordingly, the number of parent bone and coordinate values of relative positions between the parent bone and the respective bones are defined with respect to these bones.

In other words, both a row 2101 of a parent bone number and a row 2103 of relative positional information with respect to the parent bone are provided as to a bone defined by a bone number 1. Also, both a row 2111 of a parent bone number and row 2113 of relative positional information with respect to the parent bone are provided as to a bone defined by a bone number 2. Similarly, both a row 2121 of a parent bone number and a row 2123 of relative positional information with respect to the parent bone are provided as to a bone defined by a bone number "K" (symbol "K" being natural number).

It should also be noted that since the most significant-graded bone does not have a parent bone, such information "Null" indicative of empty data is stored in the parent bone number. Also, absolute positional information of the relevant bones within the virtual space is stored into the respective rows of the relative positional information with respect to the parent bone.

Skeleton Models

Figure 4D:
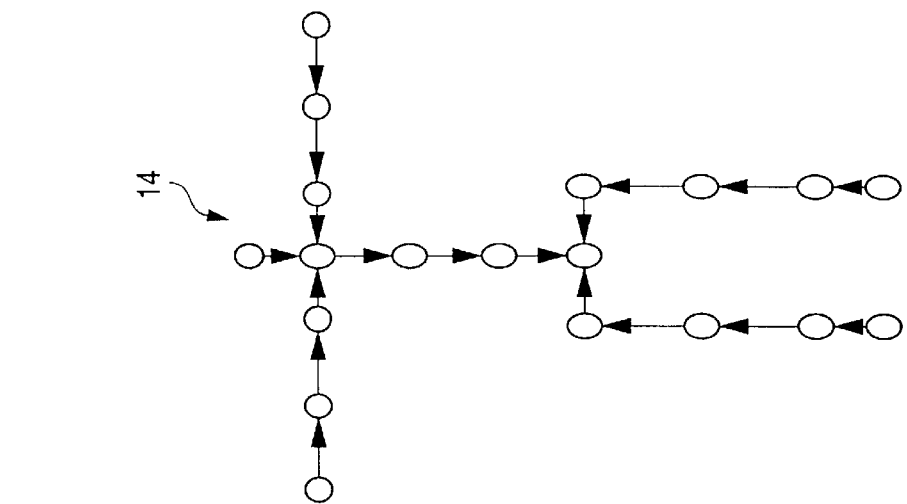
FIG. 4D is a schematic diagram for illustratively denoting a skeleton model of a large-sized model.
Figure 4C:
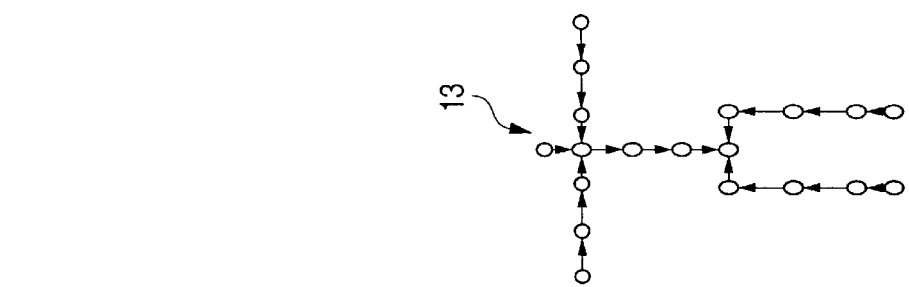
FIG. 4C is a schematic diagram for illustratively representing a skeleton model of a small-sized model.
Figure 4B:
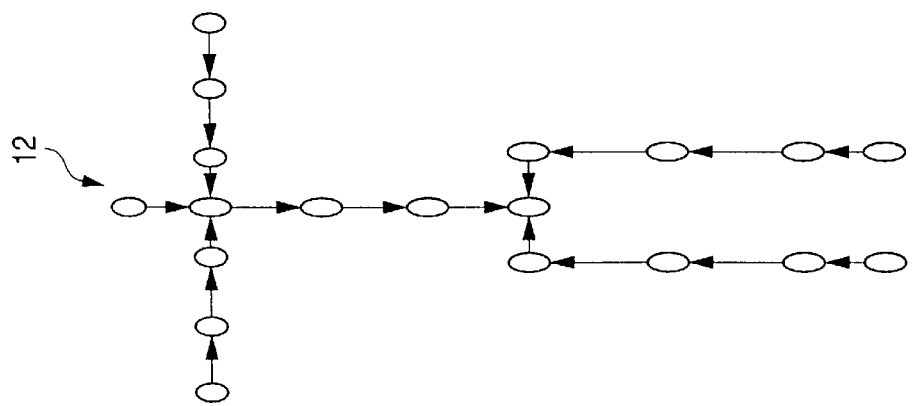
FIG. 4B is a schematic diagram for illustratively indicating a skeleton model of a tall-type model.
Figure 4A:
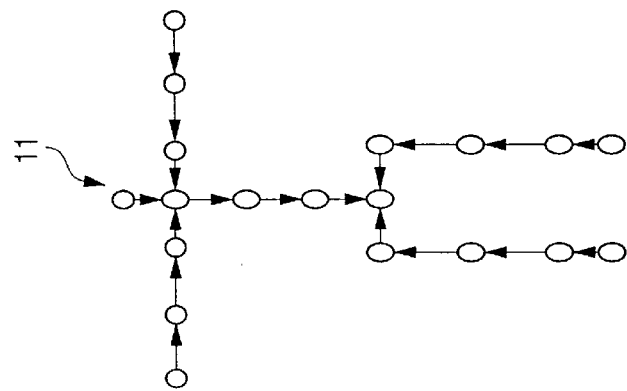
FIG. 4A is a schematic diagram for illustratively showing a base skeleton model.

FIG. 4A, FIG. 4B, FIG. 4C, and FIG. 4D are schematic diagrams for illustratively showing one example of a skeleton model. In FIG. 4A, FIG. 4B, FIG. 4C, and FIG. 4D, a set including an arrow and a circle indicates a bone. Each circle is attached to a root of its arrow. Also, an arrow further indicates a parent/child relationship between bones. That is, a root of an arrow shows a child whereas a tip of this arrow indicates a parent. FIG. 4A is a schematic diagram for illustratively showing a base skeleton model corresponding to a standard human model. FIG. 4B is a schematic diagram for illustratively indicating a skeleton model 12 of a tall-type human model. As to the tall-type skeleton model 12 of FIG. 4B, the lengths of the respective bones indicated by arrows along upper/lower directions become longer than those of the base skeleton model 11 shown in FIG. 4A. Also, FIG. 4C is a schematic diagram for illustratively showing a skeleton model 13 of a small-sized human model. As to the small-sized skeleton model 13 of FIG. C, the lengths of the respective bones equally become short along the upper/lower directions as well as the right/left directions, as compared with the base skeleton model of FIG. 4A. FIG. 4D is a schematic diagram for illustratively representing a skeleton model 14 of a long-sized human model. As to the large-sized skeleton model 13 of FIG. C, the lengths of the respective bones equally become long along the upper/lower directions as well as the right/left directions, as compared with the base skeleton model of FIG. 4A.

As apparent from the foregoing description, the skeleton models 12, 13, and 14 shown in FIG. 4B, FIG. 4C, and FIG. 4D are typical model examples. Alternatively, for example, skeleton models indicative of physique of actual wrestlers may be produced with respect to each professional wrestler. On the other hand, the base skeleton model is formed in such a manner that this base skeleton model indicates, for example, average physique of wrestlers. Alternatively, while judging that a specific wrestler has a standard bodily shape, such a skeleton model representative of this bodily shape of the specific wrestler may be used as the base skeleton model. It should be noted that in this embodiment, the parent/child relationship between the bone number and the bone as to the base skeleton model is identical to that of the skeleton model of each character. Similarly, the bone numbers given to the bones as to the base skeleton model are identical to those of the skeleton model of each character.

Motion Data

Figure 5:
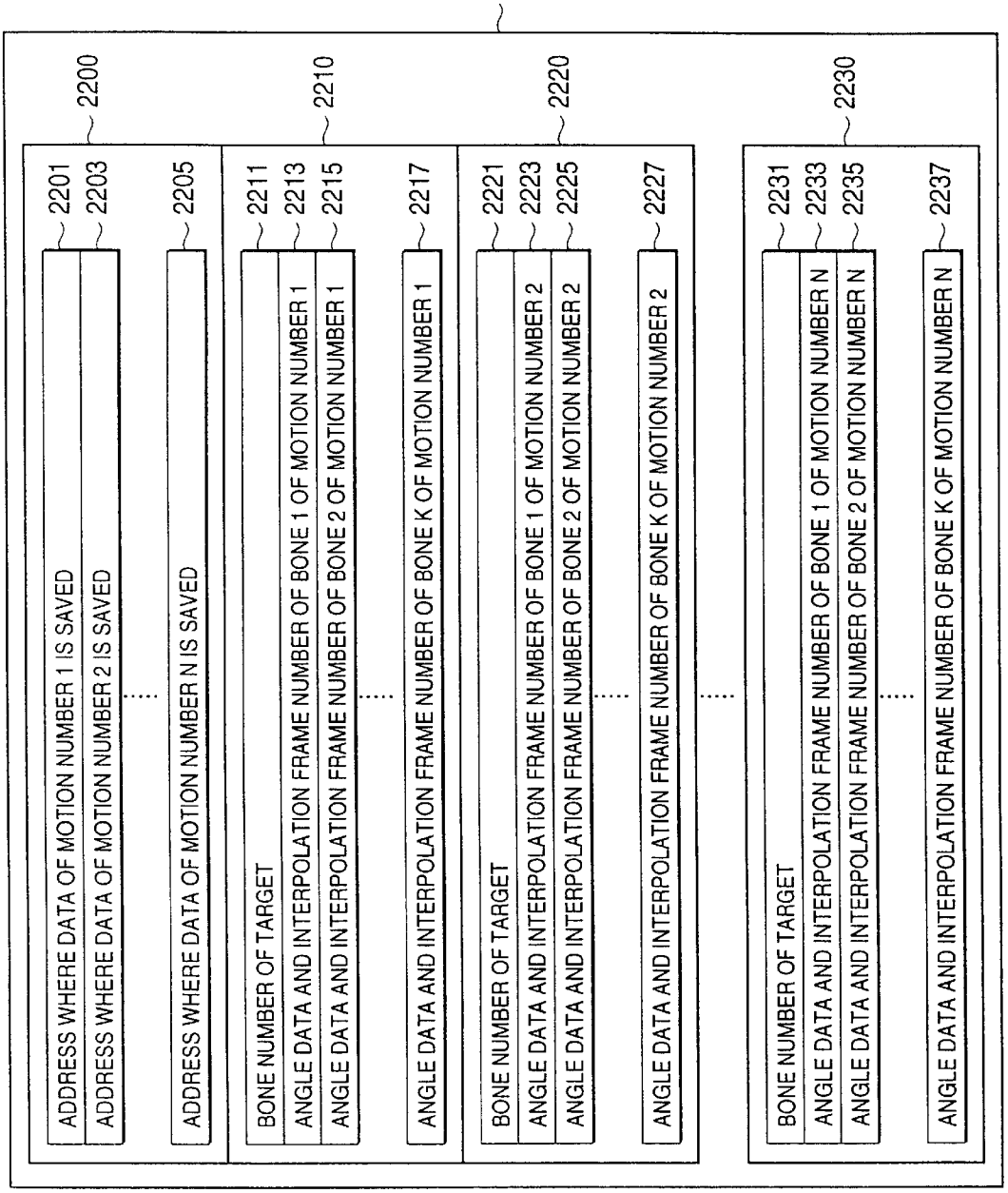
FIG. 5 is a schematic diagram for schematically showing an example of a data format of motion data stored in the RAM of FIG. 2.

FIG. 5 represents an example of motion data used in the home-use game machine 101, according to this embodiment. The motion data 220 contains a header portion 2200, a data portion 2210 of motion number 1, a data portion 2220 of motion number 2, and similarly, a data portion 2230 of motion number N (symbol "N" being natural number). The header portion 2200 is provided with a row 2201, a row 2203, and a row 2205. In the row 2201, an address of a storage area where the data of the motion number 1 is saved is stored. In the row 2203, an address of a storage area where the data of the motion number 2 is saved is stored. Similarly, in the row 2205, an address of a storage area where the data of the motion number N is saved is stored.

The data portion 2210 of the motion number 1 contains a row 2211 of a bone number which constitutes a target in a character of a counter party; a row 2213 of both angle data and an interpolation frame number about the bone 1 of the motion number 1; a row 2215 of both angle data and an interpolation frame number about the bone 2 of the motion number 2; and similarly, a row 2217 of both angle data and an interpolation frame number about the bone N of the motion number 1. It should be noted that angle data in a frame (key frame) which constitutes a key when motion is reproduced is stored in motion data. As a result, the angle data in the respective frames defined between the start of the motion and the end of the motion, except for the key frame, may be calculated in such a manner that the angle data in the key frames located before/after the relevant frame is interpolated based upon a preselected interpolation ratio.

The data portion 2220 of the motion number 2 contains a row 2221 of a bone number which constitutes a target in a character of a counter party; a row 2223 of both angle data and an interpolation frame number about the bone 1 of the motion number 2; a row 2225 of both angle data and an interpolation frame number about the bone 2 of the motion number 2; and similarly, a row 2227 of both angle data and an interpolation frame number about the bone N of the motion number 2. Subsequently, the data portion 2230 of the motion number N contains a row 2231 of a bone number which constitutes a target in a character of a counter party; a row 2233 of both angle data and an interpolation frame number about the bone 1 of the motion number N; a row 2235 of both angle data and an interpolation frame number about the bone 2 of the motion number N; and similarly, a row 2237 of both angle data and an interpolation frame number about the bone N of the motion number N.

It should also be understood that such a valid value only when such motion is carried out in order that one character attacks a preselected portion (for example, head) of another character is set into the row of the bone number which constitutes the target, and an invalid value (for example, "null") is set into this row in other cases. In accordance with this embodiment, angle data may be defined by local bending angles from the X axis, the Y axis, and the Z axis, while a point defined at an end portion of each bone is recognized as an origin. Also, in accordance with this embodiment, motion data is formed in such a manner that when the base skeleton model is operated, a skeleton model is moved by the most proper operation. In other words, when the base skeleton model is operated by way of such motion of grasping a rope of a wrestling ring, such motion is carried out in which a hand of this base skeleton model can just reach the rope. Another assumption is made as follows: That is, such motion that a certain character hits a head of another character by his hand is carried out. In this case, if the physique of the respective characters is expressed by the base skeleton model, then such motion that a hand of a certain character correctly hits a head of another character is carried out.

As indicated in FIG. 5, only the angle data and also the interpolation frame number of the respective bones are stored in the motion data, and only the commonly-used data are stored in the respective skeleton models. As a consequence, for instance, as indicated in FIG. 6A, the same attitude obtained in such a case that motion data (only angle data) indicative of, e.g., an attitude before fight is applied to the base skeleton model may be realized, in the case that the same motion data (only angle data) is applied to the tall-type skeleton model 12, the small-sized skeleton model 13, and the large-sized skeleton model 14, as indicated in FIG. 6B, FIG. 6C, and FIG. 6D.

It should also be understood that since the physique of the respective characters is different from each other, there are differences in positions of feet, positions of hands, and positions of heads. If the commonly used motion data shown in FIG. 5 are applied in such a case that more than 2 characters attack each other, the positions of the hands and also the position of the feet of the attacking character cannot be hit to the head and the chest of the counter party. In other words, the positions of the hands and the positions of the feet of the attacking character are required to be corrected.

Figure 7:
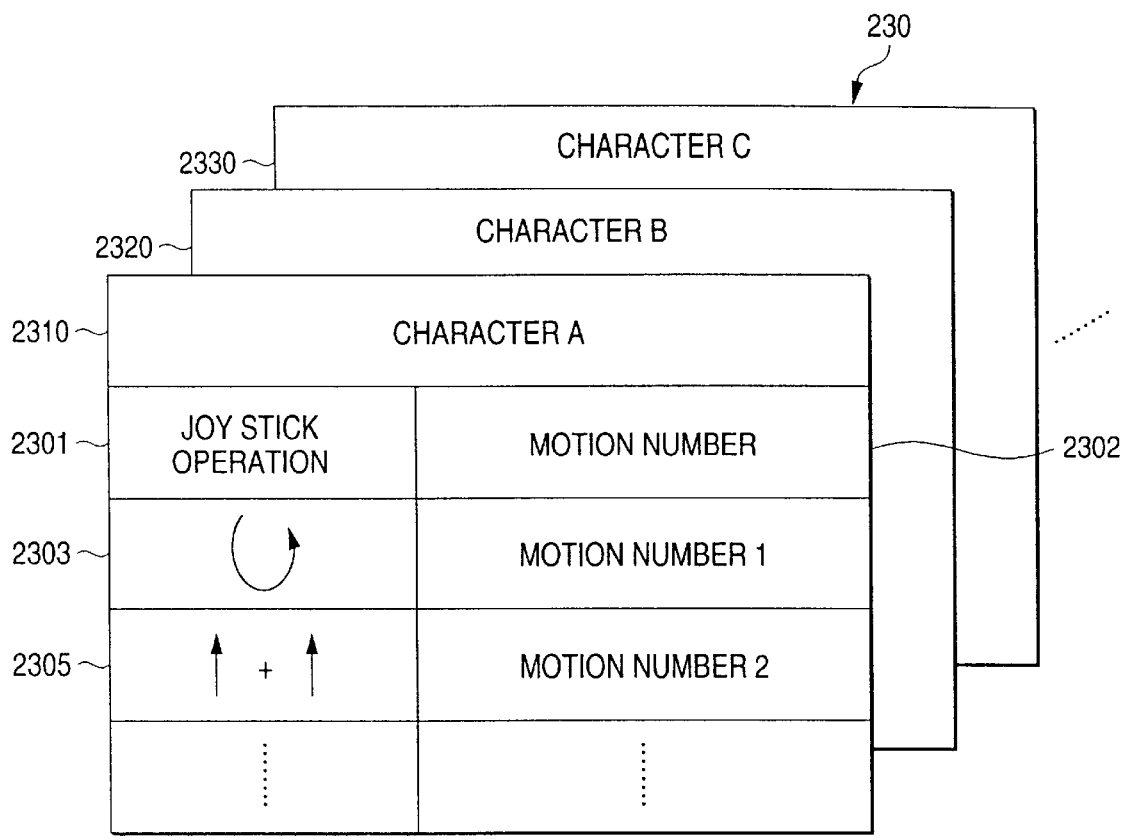
FIG. 7 is a schematic diagram for schematically showing an example of contents of a motion operation correspondence table.

FIG. 7 schematically shows a content of a motion operation correspondence table 230 in this embodiment. As indicated in FIG. 7, this motion operation correspondence table 230 is provided for each of the characters. In other words, in FIG. 7, a table 2310 corresponding to a character "A", a table 2320 corresponding to a character "B", and a table 2330 corresponding to a character "C" are provided as the motion operation correspondence table 230. As previously explained, the reason why the motion operation correspondence table is provided for every character is given as follows: Since the characters of the fighting game have favorable techniques different from each other, the simpler operations of the joystick 161a are desirably allocated to the favorable techniques. In accordance with this embodiment, the motion can be designated only by manipulating the joystick 161a. As a consequence, both the column 2301 of the joystick manipulation and the column 2302 of the motion number are provided in this motion operation correspondence table 230.

For instance, in the table 2310 corresponding to the character "A", when the joystick 161a is turned along the counter clockwise direction, the motion number 1 is designated, for example, a rolling kick is designated (row 2303). Also, when the joystick 161a is operated along the upper direction, the motion number 2 is designated, for example, a drop kick is designated (row 2305). In the motion operation correspondence table 230 of FIG. 7, for the sake of easy understandings, the operation directions of the joystick 161a are indicated in the column 2301 of the joystick operation. In an actual case, the operation codes and the like, which are output from the joystick 161a, are stored in the column 2301 of the joystick operation.

Although not shown in FIG. 2, a portion of the game program 133 according to this embodiment is also stored in the RAM 105.

Motion Corrections by Inverse Kinematics

Figure 8:
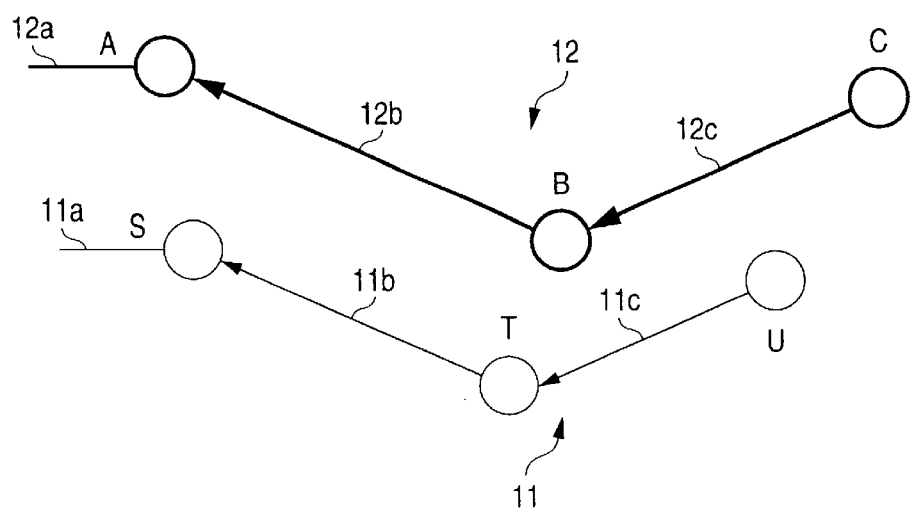
FIG. 8 is a first schematic diagram for illustratively explaining an inverse kinematics process operation.

In accordance with this embodiment, motion is corrected by using the inverse kinematics (IK) process operation. FIG. 8 illustratively shows both conditions of bones 12a, 12b, and 12c in the case that certain motion data is applied to the skeleton model 12 of the tall-type character, and conditions of bones 11a, 11b, and 11c in the case that the same motion data is supplied to the base skeleton model 11 corresponding to this character. In FIG. 8, alphabetical symbols "A", "B", and "C" indicate positions of a shoulder, an elbow, and a hand of the skeleton model 12, whereas alphabetical symbols "S", "T", and "U" represent positions of a shoulder, an elbow, and a hand of the skeleton model 11.

FIG. 8 is such an assumption that motion is carried out by which the character grasps, for example, a rope of a wrestling ring. Since the motion data used in this example of FIG. 8 is produced based upon such an initial condition that the base skeleton model is operated, a position of a hand (namely, portion indicated by circle "U" in this case) of the base skeleton model is just made coincident with the position of the rope. Since a position of a hand (namely, portion indicated by circle "C" in this case) of the skeleton model of the character is not made coincident with the position of the rope, such an image that this character grasps the rope cannot be formed under such a circumstance.

For instance, similar to the cases shown in FIG. 4 and FIG. 6, in FIG. 8, FIG. 9, FIG. 10, and FIG. 11, a set including an arrow and a circle is used as a bone. This circle is attached to a root portion of this arrow. Assuming now that a point functioning as a reference point located in a center of a circle, as to a circle "A", the reference point is referred to as a point "A"; as to a circle "B", the reference point is referred to as a point "B"; as to a circle "C", the reference point is refereed to as a point "C"; as to a circle "S", the reference point is referred to as a point "S"; as to a circle "T", the reference point is referred to as a point "T"; and as to a circle "U", the reference point is referred to as a point "U".

Figure 9:
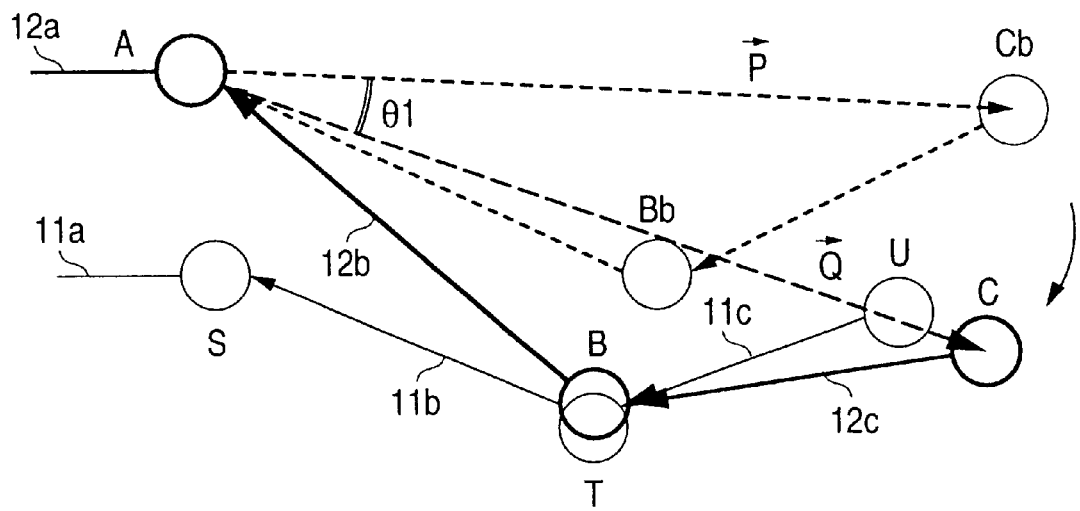
FIG. 9 is a second schematic diagram for illustratively explaining an inverse kinematics process operation.

In this case, the position (circle "U") of the hand of the character is moved to the position (circle "C") of the hand of the base skeleton model. First of all, as indicated in FIG. 9, both the bone 12b and the bone 12c are rotated, while the point "A" is set as a center. In FIG. 9, a point "Bb" indicates a point of the point "B" before being rotated, and a point "Cb" represents a point of the point "C" before being rotated. The rotation is carried out in such a manner that a vector "P" defined from the point "A" to the point "Cb" represents a point of the point "C" before being rotated. The rotation is carried out in such a manner that a vector "P" defined from the point "A" to the point "Cb" becomes another vector "Q" defined from the point "A" to the point "U", while the point "A" is set as a center. The rotation direction corresponds to the clockwise direction in FIG. 9. Concretely speaking, an outer product of the vector P and the vector Q is calculated, and such an axis which is located in parallel to the calculated vector and passes through the point "A" is used as a rotation axis. Also, a dot product of the vector P and the vector Q is divided by an absolute value of each of the vectors so as to calculate a value of $\cos(è1)$. Then, an angle "è1" is calculated based upon arc-cosine. This angle "è1" is equal to a rotary angle.

Figure 10:
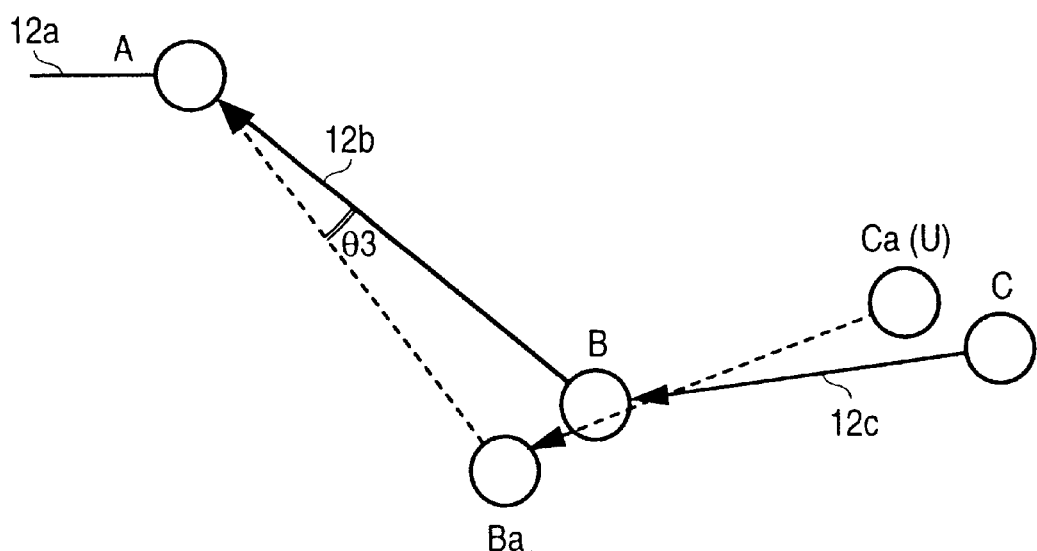
FIG. 10 is a third schematic diagram for illustratively explaining an inverse kinematics process operation.

Under this condition shown in FIG. 9, the point "C" is moved to the point "U". When this point movement is carried out, the length of the bone is not changed. In other words, neither the length (namely, distance from point C to point B) of the bone 12c is changed, nor the length (namely, distance from point B to point A) of the bone 12b is changed. It should be noted that the distance from the point A to the point C is changed into another distance from the point A to the point Ca (=point U), as indicated in FIG. 10. As a result, both an angle "ABC" and an angle "CAB" in a triangle "ABC" are changed into both an angle "ABaCa" and an angle "CaABa" in another triangle "ABaCa (point "Ba" corresponds to such point where point "B" has been moved)", respectively. Three angles may be calculated from lengths of three edges of the triangle. In this case, angle "ABC"–angle "ABaCa"=è2, where as angle BaCaA–angle BCA=è3. If the angles are known, then positions of the respective points may be calculated.

Figure 11:
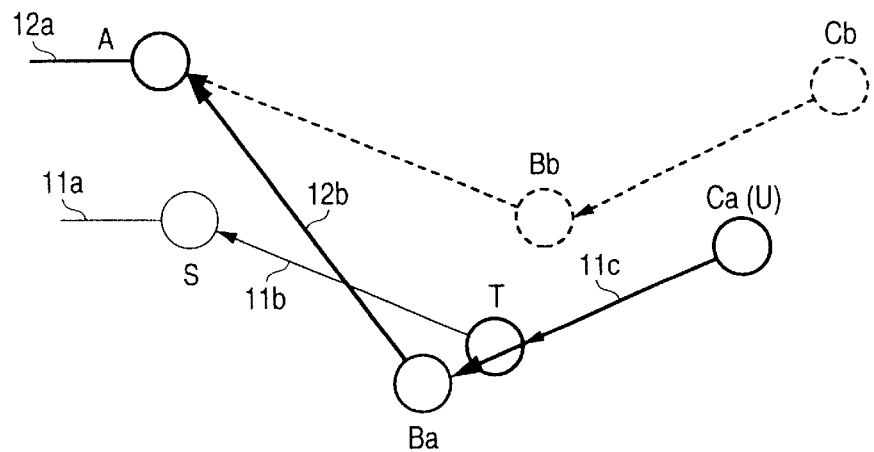
FIG. 11 is a fourth schematic diagram for illustratively explaining an inverse kinematics process operation.

A skeleton model schematic diagram of FIG. 11 is obtained in such a case that both the angle "è1" calculated in FIG. 9 and the angle "è3" calculated in FIG. 10 are applied to the bone 12b, and further, the angle "è2" calculated in FIG. 10 is applied to the bone 12c. In other words, both the bone 12b between the point A and the point Bb, which are indicated as a dot line, and the bone 12c between the point Bb and the point Cb, which are indicated as a dot line, become the bone 12b between the point A and the point Ba, which are expressed as a solid line, and the bone 12c between the point Ba and the point Ca (=point U), which are expressed as a solid line.

It should also be noted that FIG. 8, FIG. 9, FIG. 10, and FIG. 11 are diagrams for explaining such a case that the motion is accomplished within 1 game. For example, as indicated in FIG. 12, a description will now be made of a process operation executed in such a case that motion is accomplished within 6 frames.

Figure 12:
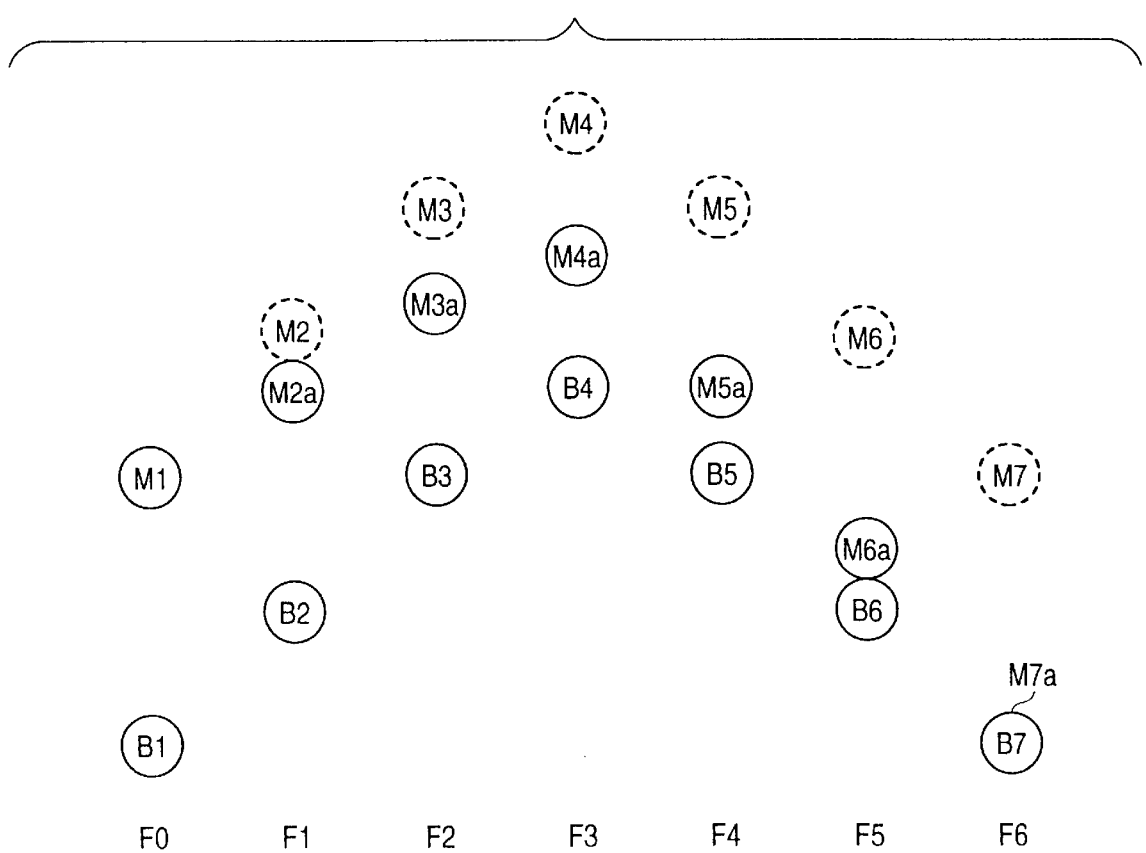
FIG. 12 is a fifth schematic diagram for illustratively explaining an inverse kinematics process operation.

In FIG. 12, a position B1 (frame F0) of a certain portion (for example, hand) of a base skeleton model before motion is commenced is indicated; positions B2, B3, B4, B5, and B6 of the hand of the base skeleton model is the respective interpolation frames (frames F1, F2, F3, F4, and F5) while the base skeleton model executes predetermined motion are represented; and also a final position B7 (frame F6) of the hand of this base skeleton model is shown. The positions B2, B3, B4, B5, and B6 of the hand in the respective interpolation frames may be calculated by interpolating such an angle required to rotate the base skeleton model in order to realize the final position B7 of the hand by using an equal ratio calculated by a total number of interpolation frames (six frames in this example).

On the other hand, an attitude position of a hand owned by a skeleton model of a character before motion thereof is commenced is equal to M1 (frame F0). Positions of the hand owned by the skeleton model of the character in such a case that the same motion data as that of the base skeleton model is applied thereto are indicated as M2, M3, M4, M5, M6, and M7, which are indicated by dotted circles, in the respective interpolation frames (namely, frames F1, F2, F3, F4, and F5), and also the final frame (namely, frame F6). These positions M2, M3, M4, M5, and M6 may be calculated in a similar manner used in the base skeleton model in such a manner that such an angle is interpolated by an equal ratio obtained from a total number (in this case, six frames) of interpolation frames, and this angle must be rotated in order to realize the final position M7.

As indicated in FIG. 12, if the motion data is simply applied to the skeleton model of the character, then the final position of the hand owned by the skeleton model of the character is not made coincident with the position of the hand owned by the base skeleton model. A difference between the position B7 and the position M7 is slightly corrected in the respective frames (namely, frames F1, F2, F3, F4, F5, and F6). In this embodiment, since a total number of the interpolation frames is selected to be 6, a difference between the hand position of the skeleton model of the character and the hand position of the base skeleton model is corrected from the frame F1 to the frame F6 based upon an equal interpolation ratio.

That is to say, in the frame F1, a calculation is made of such a point M2$a$ which internally divides a line segment into 5:1. The line segment is defined from the position B2 of the hand owned by the base skeleton model to the position M2 of the hand owned by the skeleton model. Then, the IK (inverse kinematics) process operation is carried out in order that the hand owned by the skeleton model of the character is moved to this point M2$a$. Next, in the frame F2, a calculation is made of such a point M3$a$ which internally divides a line segment into 2:1. The line segment is defined from the position B3 of the hand owned by the base skeleton model to the position M3 of the hand owned by the skeleton model. Then, the IK (inverse kinematics) process operation is carried out in order that the hand owned by the skeleton model of the character is moved to this point M3$a$. Next, in the frame F3, a calculation is made of such a point M4$a$ which internally divides a line segment into 1:1. The line segment is defined from the position B4 of the hand owned by the base skeleton model to the position M4 of the hand owned by the skeleton model. Then, the IK (inverse kinematics) process operation is carried out in order that the hand owned by the skeleton model of the character is moved to this point M4$a$. Also, in the frame F4, a calculation is made of such a point M5$a$ which internally divides a line segment into 1:2. The line segment is defined from the position B5 of the hand owned by the base skeleton model to the position M5 of the hand owned by the skeleton model. Then, the IK (inverse kinematics) process operation is carried out in order that the hand owned by the skeleton model of the character is moved to this point M5$a$. Next, in the frame F5, a calculation is made of such a point M6$a$ which internally divides a line segment into 1:5. The line segment is defined from the position B6 of the hand owned by the base skeleton model to the position M6 of the hand owned by the skeleton model. Then, the IK (inverse kinematics) process operation is carried out in order that the hand owned by the skeleton model of the character is moved to this point M6$a$. In the frame F6, the IK process operation is carried out in such a manner that the position M7 of the hand owned by the skeleton mode of the character is located at the position B7 of the hand owned by the base skeleton model.

Game Process Operation

A description will now be made of a process flow operation of the computer game program according to this embodiment, while employing the above-explained initial conditions.

Referring back to FIG. 1, when the home-use game machine 101 is initiated, the CPU 103 reads out both the game program 133 and the data 135 from the CD-ROM 131 via the CD-ROM drive 113 based upon the operating system (OS) stored in the ROM 104 and the like. The game program 133 and the data 135 are required to execute an image process operation and a computer game. Then, the CPU 103 transfers the read game program 133 and the read data 135 to the RAM 105. Subsequently, the CPU 103 executes the game program 133 transferred to the RAM 105, so that the below-mentioned process operation is realized.

It should be noted that among the control operations and the process operations executed in the home-use game apparatus 101, the circuit other than the CPU 103 executes the actual control operation and the actual process operation in conjunction with the CPU 103.

In an actual case, in accordance with an instruction issued from the CPU 103, both the game program 133 and the data 135, which are required to execute the image process operation and the game, are sequentially read out from the CD-ROM 131 in response to the processing conditions of the process operation, and then, the read game program 133 and data 135 are transferred to the RAM 105. However, for the sake of easy understandings of the present invention, the data reading operation from the CD-ROM 131, and also the data transferring operation to the RAM 105 are omitted in the below-mentioned description of the embodiment.

Also, in such a case that both the game program 133 and the data 135, which are required to execute the image process operation and the game, are stored in the HDD 107, the game program 133 and the data 135 are sequentially read out from the HDD 107 in accordance with an instruction issued from the CPU 103 in response to the processing condition of the process operation, and thereafter, are transferred to the RAM 105. However, similar to the above-explained reasons, no description is made of reading the data from the HDD 107 and also of transferring the read data to the RAM 105 in the following specification.

Main Display Process Operation

Figure 13:
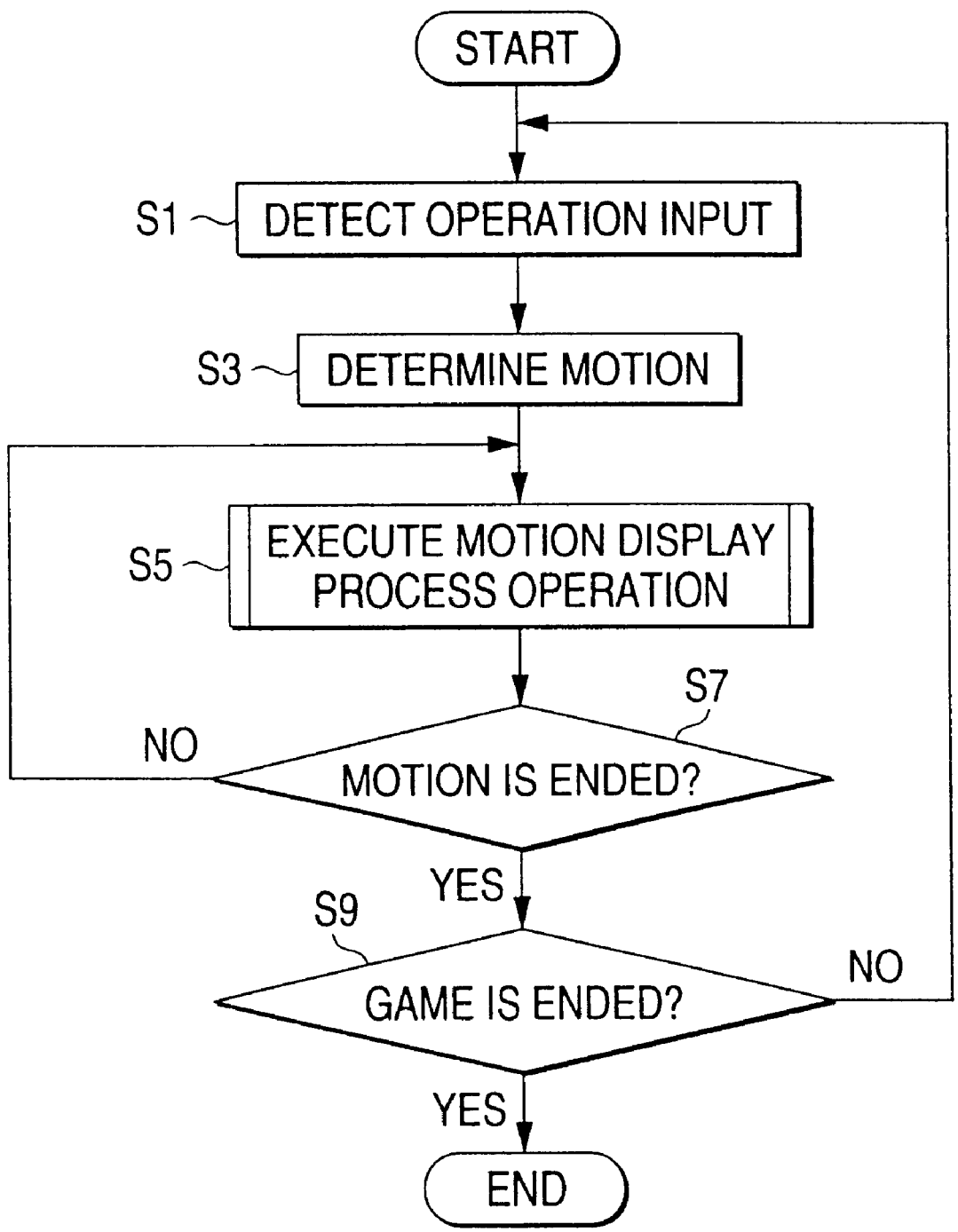
FIG. 13 is a flow chart for describing a main flow process operation of the computer readable program according to an embodiment of the present invention.

FIG. 13 is a flow chart for describing a main display process operation in such a case that a character executes motion instructed by a game player. In this main flow chart, a process operation for detecting an operation input is firstly executed (step S1). In this embodiment, the CPU 103 continuously checks an operation input entered from the keypad 161 which is manipulated by the game player, and more specifically, extracts the operation input made from the joystick 161a. Subsequently, in this embodiment, the CPU 103 determines a sort of motion which is executed by the own character based upon the operation input made by the joystick 161a (step S3).

Based upon the determined sort of motion, the CPU 103 executes a motion display process operation (will be discussed later in detail) at a step S5. This motion display process operation is carried out every display frame. Then, a check is made as to whether or not this motion is accomplished, namely whether or not the present display frame is reached to a final display frame of this motion (step S7). When the present display frame is not reached to the final display frame of this motion, the process operation is returned to the previous step S5 (step S7: NO route). On the other hand, when the present display frame is reached to the final display frame (step S7: YES route), the CPU 103 judges as to whether or not the game is ended (step S9). The judgement as to whether or not the game is ended is made based upon the following check result. That is, for example, the CPU 103 checks as to whether or not the user manipulates the keypad 161 so as to accomplish the game, or whether or not the game ending condition given to the story of this game can be satisfied. When the CPU 103 judges that the game is not ended, the process operation is returned to the previous step S1 (step S9: NO route). To the contrary, when the game is ended, the CPU 103 accomplishes the process operation (step S9: YES route).

Figure 14:
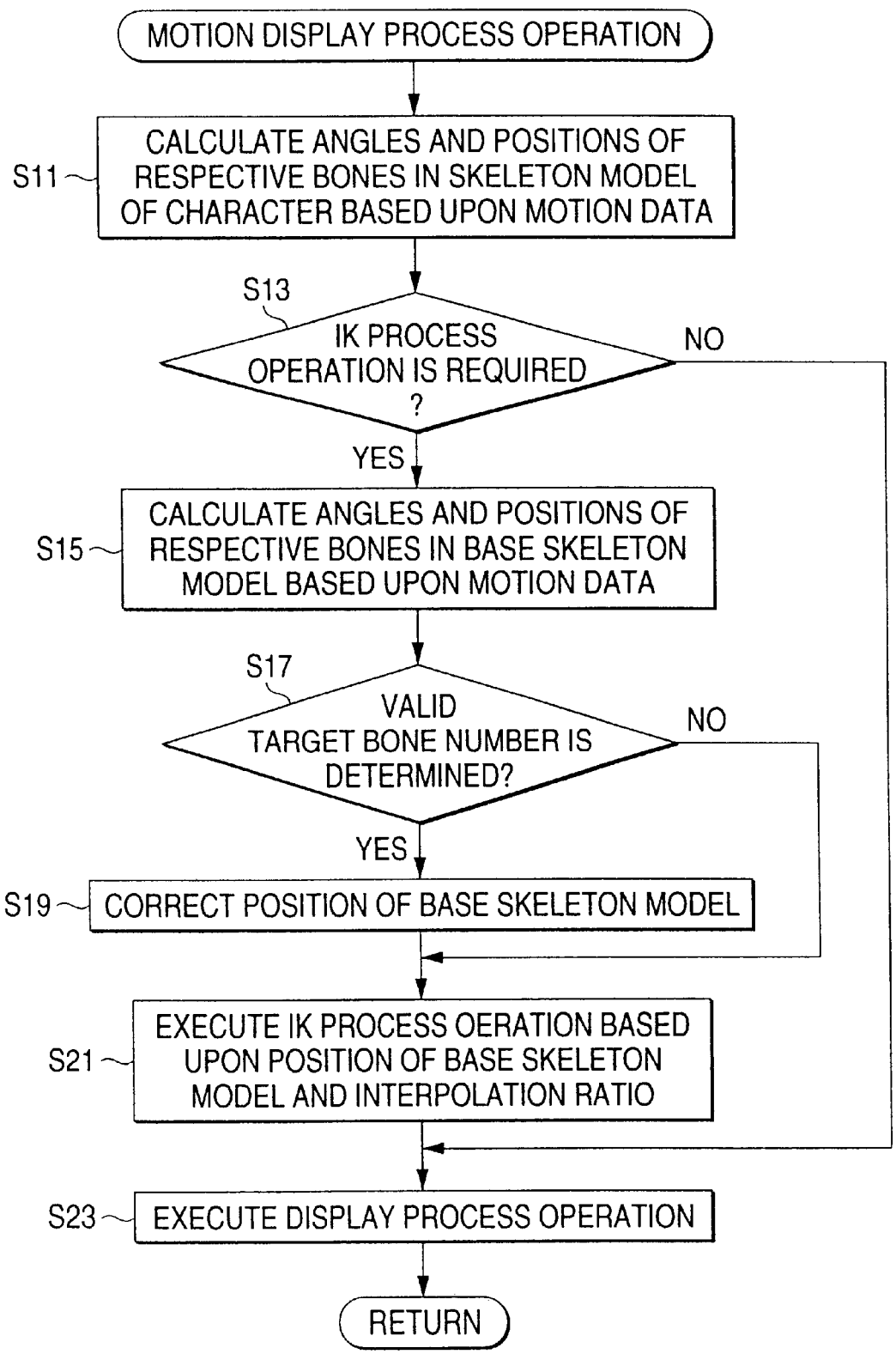
FIG. 14 is a flow chart for describing a motion display process operation of the computer readable program according to the embodiment of the present invention.

Next, a motion display process operation will now be described with reference to FIG. 14. First, at a step S11, the CPU 103 calculates angles and positions of the respective bones in a skeleton model of a character based upon motion data corresponding to a type of motion. The motion display process operation according to this embodiment is carried out every display frame. As a result, both the angles and the positions of the respective bones calculated at the step S11 are equal to both angles and positions of the respective bones in a certain display frame. For example, when such a definition is made that a total number of interpolation frames as to a certain bone is 10 and an angle of 30 degrees is set to motion data, the angle is changed every 3 degrees with respect to each of the interpolation frame. When a third interpolation frame in the same motion is present, a calculation is made of such a position when the angle is rotated by 9 degrees from the angle of the first frame. As to a position, a position of a child bone cannot be determined unless a position of a parent bone is determined. As a result, positions of bones are sequentially calculated from the position of the parent bone.

Next, the CPU 103 judges as to whether or not the IK process operation is required (step S13). In general, this judgement is made based upon the sort of motion. In other word, the IK process operation is not required in such a motion case that a character touches a subject, or does not attack a counter party (enemy character), for instance, motion of a character before fighting, or motion of a character which simply runs. When the CPU 103 judges that the IK process operation is not required (step S13: NO route), the motion display process operation is advanced to a step S23. On the other hand, the IK process operation is required in such a motion case that a character touches a subject, or attacks a counter party.

When the IK process operation is required (step S13: YES route), angles and positions of the respective bones in the base skeleton model are calculated based upon the motion data (step S15). Similar to the previous steps, both the angle and the positions of the respective bones calculated in this step S15 are equal to both angles and positions of the respective bones in a certain display frame. As a consequence, the angles defined in the motion data are interpolated in each of the interpolation frames, and then, the angles are rotated by these interpolated angles. Also, in the base skeleton model, if the positions as to the parent bones are not determined, then the positions as to the child bones cannot be determined. Accordingly, the positions with respect to the parent bones are sequentially calculated.

Next, the CPU 103 judges as to whether or not a valid target bone number is defined in the motion data (step S17). When such a valid target bone number is not defined, the own character which is manipulated by the game player may attack the enemy character, so that a contact between the own character and the enemy character will occur. On the other hand, such a case that the target bone number becomes an invalid value (for example, null), and is not defined, is given as follows: For example, the own character which is manipulated by the game player statically touches a rope of a wrestling ring, or grasps a stationary tool.

When the valid target bone number is not defined (step S17: NO route), the motion display process operation is advanced to a further step S21 so as to execute the process operation as explained with reference to FIG. 12. To the contrary, when the valid target bone number is defined (step S17: YES route), the position of the hand owned by the base skeleton model is corrected (step S19). This correction of the hand position as to the base skeleton model is carried out based upon a relative positional relationship between a target bone owned by a skeleton model of a character to be attacked, and a target bone owned by a base skeleton model corresponding to this character to be attacked. The content of this hand position correction will be explained more in detail.

Then, the IK process operation is carried out based upon the position of the base skeleton model and the interpolation ratio (step S21). When the CPU 103 judges that the valid target bone number is not defined at the step S17, the process operation as explained with reference to FIG. 12 is carried out. That is, the position of the hand owned by the skeleton model of the character is approached to the position of the hand owned by the base skeleton model. On the other hand, such a process operation executed in the case that the CPU 103 judges at the step S17 that the effective target bone number is defined will be discussed more in detail in connection with the positional correction of the base skeleton model.

After the process operation defined at either the step S13 or the step S21, the display process operation is carried out, so that the motion of the own character is displayed on the display screen 120 of the TV set 121 (step S23). After this process operation defined at the step S23 is completed, the process operation is returned to the step S7 of FIG. 13.

Detailed Contents of Motion Data

Figure 15:
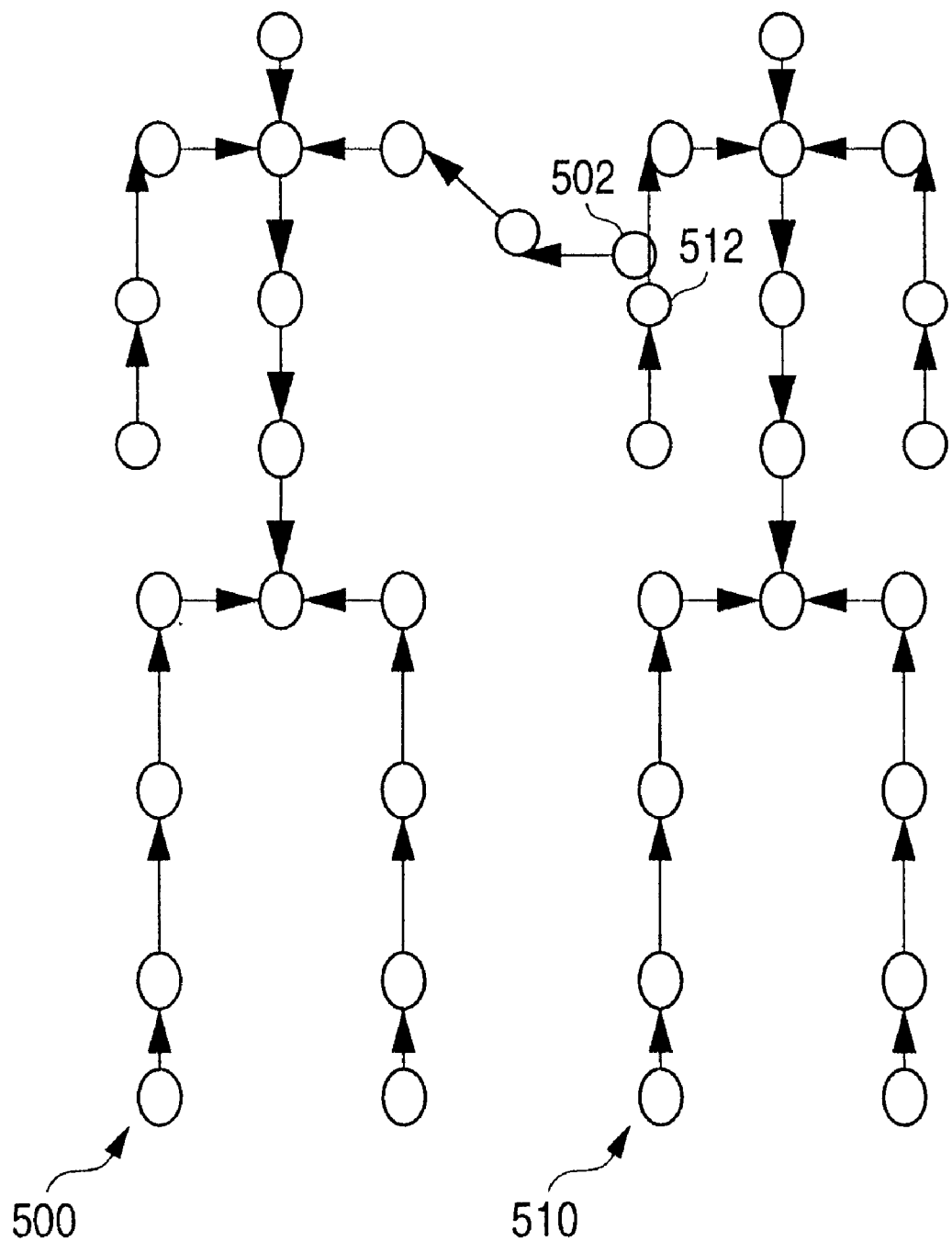
FIG. 15 is a first schematic diagram for illustratively explaining the content of the motion display process operation.

Subsequently, the contents of the process operations defined at the steps S19 and S21 will now be described more in detail. As previously explained, in accordance with this embodiment, the motion data is defined in such a way that when the motion data is applied to the base skeleton model, the proper motion is carried out. As a result, as indicated in FIG. 15, such a motion may be carried out without any correction of this motion when the base skeleton models fight with each other, namely a hand 502 of a base skeleton model 500 corresponding to the own character grasps, or grips an arm 512 of a base skeleton model 510 corresponding to an enemy character.

Figure 16:
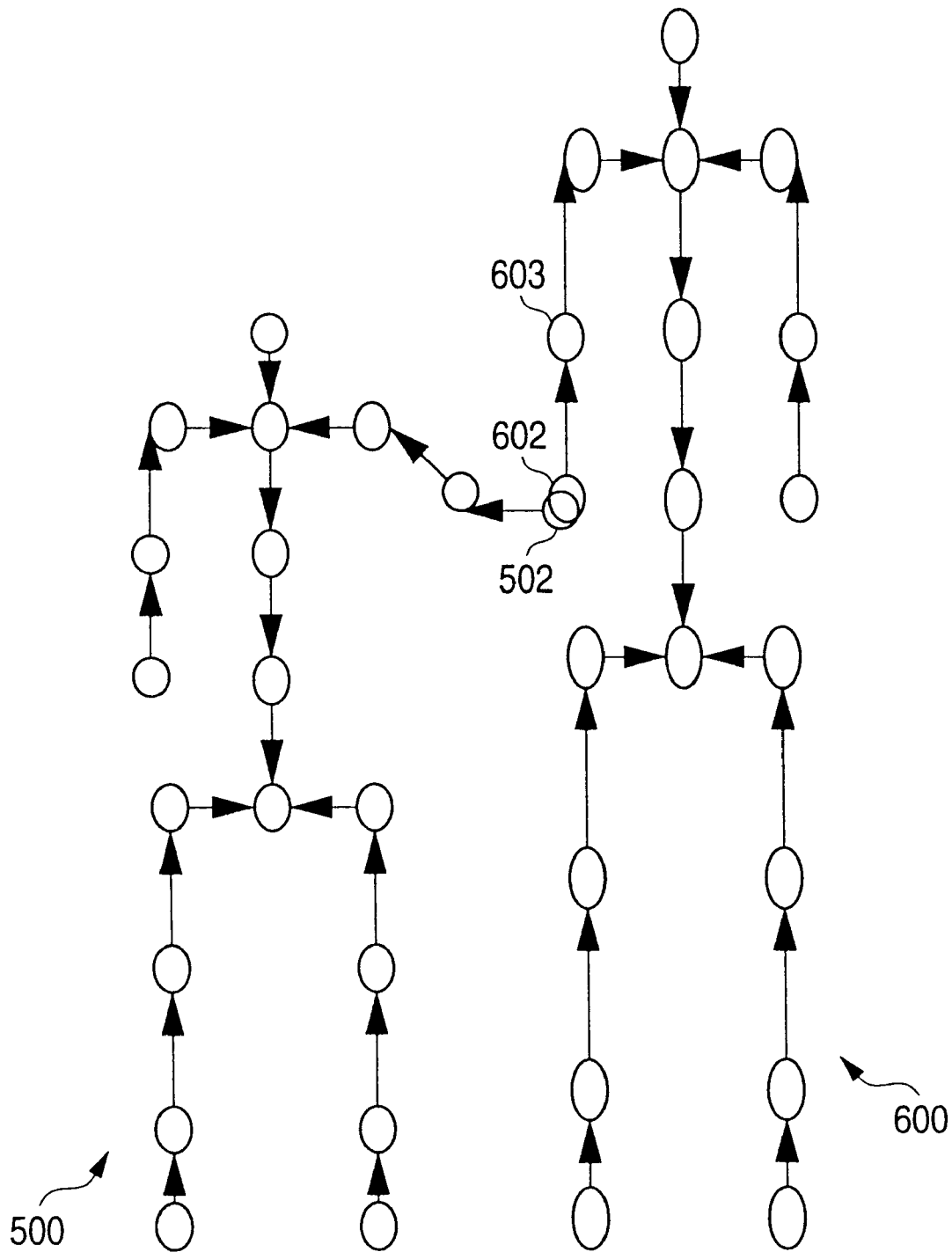
FIG. 16 is a second schematic diagram for illustratively explaining the content of the motion display process operation.

However, as illustrated in FIG. 16, when the base skeleton model 510 (see FIG. 15) corresponding to the enemy character is replaced by a skeleton model 600 corresponding to the enemy character, there is a difference between the physique of the base skeleton model 510 and the physique of the skeleton model 600. Since such a difference is produced in the physique of both the base skeleton model 500 and the skeleton model 600, the hand 502 of the base skeleton model 500 corresponding to the own character would grasp not an arm 603 having the same bone number as the target bone number, but would grapes another arm 602. In the example of FIG. 16, since the skeleton model 600 of the enemy character is taller than the base skeleton model 510, the hand 502 of the base skeleton model 500 grasps the arm 602 located lower than the target bone. Conversely, when the skeleton model 600 of the enemy character is a small-sized skeleton model smaller than the base skeleton model, the hand 502 of the base skeleton model may grasp an arm located above the target bone, or may not completely grasp this arm. Similarly, in the case of a skeleton model of the own character corresponding to the base skeleton model 500, the hand of this skeleton model cannot grasp the target bone.

Figure 17:
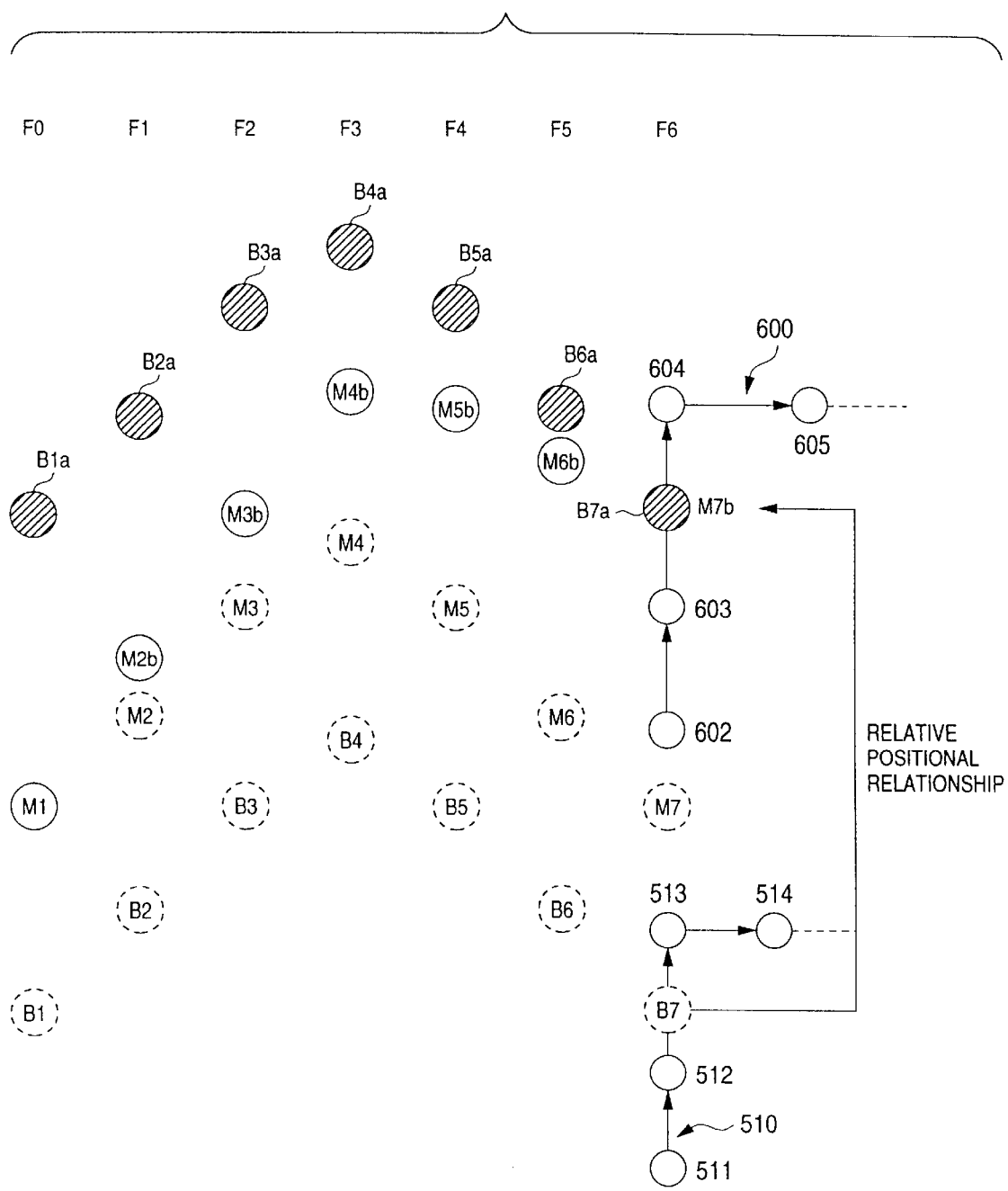
FIG. 17 is a third schematic diagram for illustratively explaining the content of the motion display process operation.

In this embodiment, the physique difference between the base skeleton model 510 corresponding to the enemy character and the skeleton model 600 of the enemy character may be reflected onto the position of the base skeleton model 500 corresponding to the own character. This reflection process operation will now be explained with reference to FIG. 17. In FIG. 17, there are illustrated a portion (bones 511, 512, 513 and 514) of the base skeleton model 510 corresponding to the enemy character, and also a portion (bones 602, 603, 604, and 605) of the skeleton model 600 of the enemy character. The positions of the hand 502 of the base skeleton model 500 corresponding to the own character before being corrected every display frame are indicated as B1, B2, B3, B4, B5, B6, and B7. Similar to FIG. 12, in this example, a total number of interpolation frames is selected to be 6. As a consequence, the positions of B2, B3, B4, B5, B6, and B7 are determined in such a way that while the angle defined in the motion data is divided by ⅙, the angle is successively added by ⅙ in each of the interpolation frames.

The final position B7 of the hand 502 owned by the base skeleton model 500 is located in the middle of the bone 512 of the base skeleton model 510. In accordance with this embodiment, the internal division ratio of the position B7 in such a case that the bone 512 is recognized as the line segment is calculated. While the length of the bone 512 is determined, the final position B7 may be determined by applying the motion data to the base skeleton model 500. This internal division ratio is applied to the skeleton model 600 of the enemy character. In other words, in the case that the bone 603 having the same bone number is used as the line segment, a point present on the bone 603, which corresponds to this final position B7, is determined based upon the internal division ratio calculated in the above calculation. In FIG. 17, a position B7a (position M7b is same point) is calculated. A relative positional relationship (shift amount) between this final position B7 and the position B7a corresponds to such data which constitutes the correction base of the position of the base skeleton model 500 used in the step S19.

Concretely speaking, the position of the base skeleton model 500 is moved by a distance equal to a vector for connecting the position B7 to the position B7a. In other words, in FIG. 17, the position of the hand 503 owned by the base skeleton model 500 is moved from B1 to B1a; from B2 to B2a; from B3 to B3a; from B4 to B4a; from B5 to B5a; from B6 to B6a; and from B7 to B7a. As a consequence, the hand 502 of the base skeleton model 500 finally can grasp the bone 603 of the skeleton model 600 of the enemy character.

Figure 18:
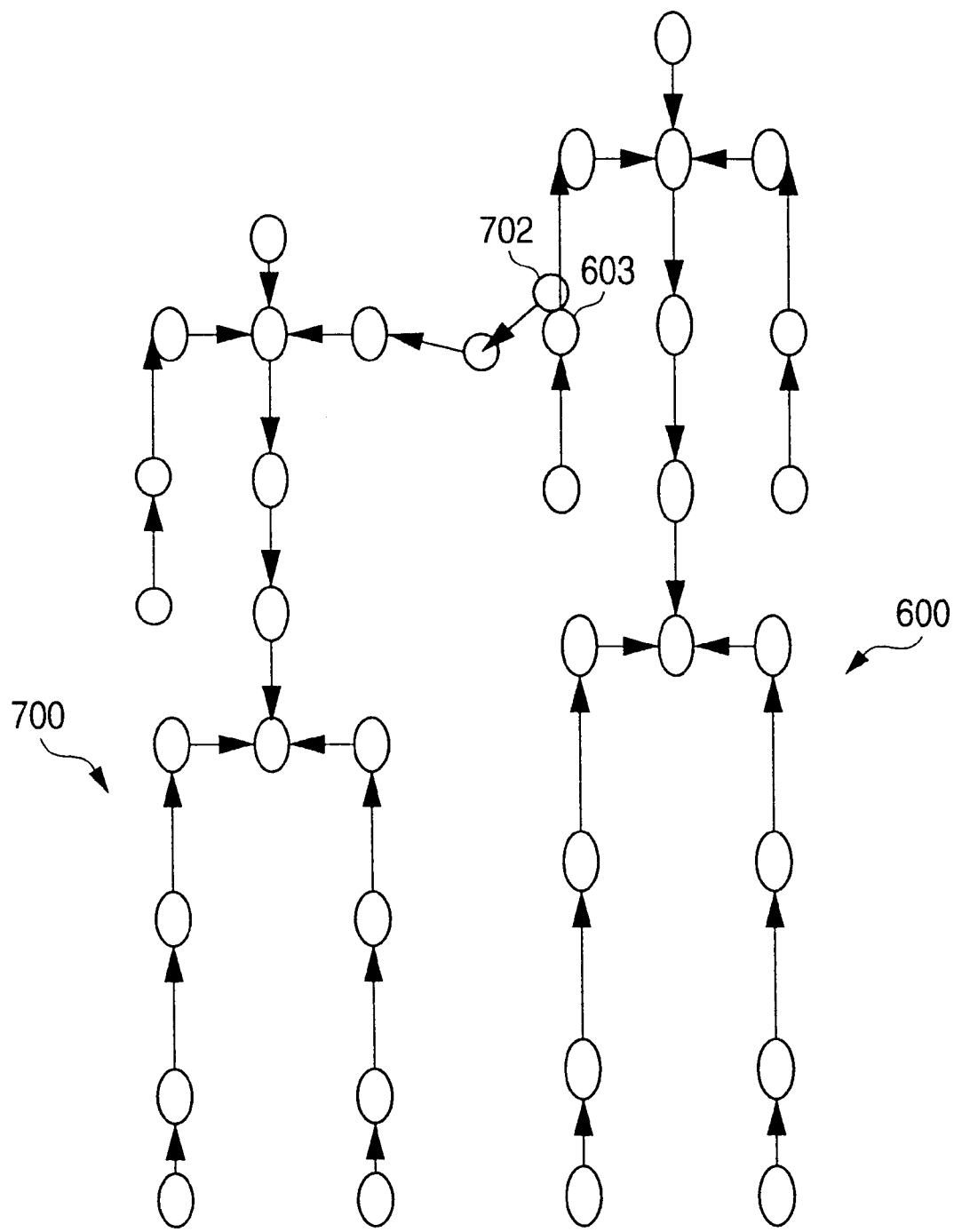
FIG. 18 is a fourth schematic diagram for illustratively explaining the content of the motion display process operation.

On the other hand, the final object of this embodiment is not such a fact that the hand 502 of the base skeleton model 500 grasps the bone 603 of the skeleton model 600 of the enemy character. That is, the hand 702 of the skeleton model 700 of the own character grasps the bone 603 of the skeleton model 600 of the enemy character. In other words, the final object of this embodiment is to achieve such a condition as shown in FIG. 18. In FIG. 17, the positions of the hand 702 owned by the skeleton model 700 of the own character are indicated as M1, M2, M3, M4, MS, M6 and M7 in such a case that the motion data is simply applied to this skeleton model 700. In this example, a total number of interpolation frames is selected to be 6. As a consequence, while the angle defined in the motion data is divided by ⅙, and also the angle is added by ⅙ in each of the interpolation frames, the positions of M2, M3, M4, M5, M6, and M7 are determined.

As shown in FIG. 17, if the motion data is simply applied to the skeleton model 700 of the own character, then the final position M7 of the hand 702 owned by the skeleton model 700 of the character is not made coincident with the corrected position B7a of the base skeleton model 500. The attitude of the own character is slightly corrected in each of the frames (namely, frames F1, F2, F3, F4, F5, and F6) in response to this difference between the position B7a and the position M7. This correction corresponds to the process operation defined at the step S21 of FIG. 14. In this embodiment, since a total number of interpolation frames is selected to be, for example, 6, the attitude of the own character is corrected by the equal interpolation ratio from the frame F1 to the frame F6.

In other words, in the frame F1, a calculation is made of such a point M2b which internally divides a line segment into 5:1. This line segment is defined from the position B2a of the hand 502 owned by the base skeleton model 500 to the position M2 of the hand 702 owned by the skeleton model 700 of the own character. Then, the IK process operation is carried out in such a manner that the hand 702 owned by the skeleton model 700 of the own character is moved to this calculated point M2b. Next, in the frame F2, a calculation is made of such a point M3b which internally divides a line segment into 2:1. This line segment is defined from the corrected position B3a of the hand 502 owned by the base skeleton model 500 to the position M3 of the hand 702 owned by the skeleton model 700 of the own character. Then, the IK process operation is carried out in such a manner that the hand 702 owned by the skeleton model 700 of the own character is moved to this calculated point M3b. Next, in the frame F3, a calculation is made of such a point M4b which internally divides a line segment into 1:1. This line segment is defined from the corrected position B4a of the hand 502 owned by the base skeleton model 500 to the position M4 of the hand 702 owned by the skeleton model 700 of the own character. Then, the IK process operation is carried out in such a manner that the hand 702 owned by the skeleton model 700 of the own character is moved to this calculated point M4b. In the frame F4, a calculation is made of such a point M5b which internally divides a line segment into 1:2. This line segment is defined from the corrected position B5a of the hand 502 owned by the base skeleton model 500 to the position M5 of the hand 702 owned by the skeleton model 700 of the own character. Then, the IK process operation is carried out in such a manner that the hand 702 owned by the skeleton model 700 of the own character is moved to this calculated point M5b. Next, in the frame F5, a calculation is made of such a point M6b which internally divides a line segment into 1:5. This line segment is defined from the corrected position B6a of the hand 502 owned by the base skeleton model 500 to the position M6 of the hand 702 owned by the skeleton model 700 of the own character. Then, the IK process operation is carried out in such a manner that the hand 702 owned by the skeleton model 700 of the own character is moved to this calculated point M6b. Next, in the frame F6, the IK process operation is carried out in such a manner that the position M7 of the hand 702 owned by the skeleton model 700 of the own character is equal to the corrected position B7a of the hand 702 owned by the model 500 of the base skeleton.

As previously described, in accordance with this embodiment, in response to the operation input made by the game player (see step S1 of FIG. 13), such a specific motion is determined (step S2) in order that a predetermined portion of a first base skeleton model is made in contact with a preselected portion of a second base skeleton model. The first base skeleton model is defined in correspondence with the own character operated by the game player, and also represents the same attitude as that of the own character. The second base skeleton model is defined in correspondence with the enemy character, and also represents the same attitude as that of the enemy character.

Then, a relative positional relationship between a preselected portion of the second base skeleton model and a preselected portion corresponding thereto in the enemy character is acquired. The position of a predetermined portion of the base skeleton model corresponding to the own character is changed by employing the acquired relative positional relationship (see step S19 of FIG. 14). Thereafter, the IK process operation is carried out in such a manner that the preselected portion of the own character is positioned also to the changed position of the predetermined portion of the base skeleton model (see step S21). This may essentially correct the specific motion. Since this corrected specific motion is executed by the own character, such a scene for executing the following motion is displayed at the step S23. That is, in this motion, the predetermined portion of the own character corresponding to the predetermined portion of the first base skeleton model is made in contact with the predetermined portion of the enemy character corresponding to the predetermined portion of the second base skeleton model.

As explained above, the specific motion defined with respect to the base skeleton model is corrected by employing the relative positional relationship indicative of the physique difference between the enemy character and the base skeleton model corresponding to the enemy character. As a result, the own character can give proper attacks to the enemy character. In other words, such a specific motion is carried out in such manner that the predetermined portion of the own character is made in contact with the preselected portion of the enemy character.

It should also be understood that the predetermined portion of the second base skeleton model corresponds to such a position obtained by internally dividing a predetermined target bone by a preselected ratio. Also, the predetermined portion of the enemy character corresponding to a predetermined portion of the second base skeleton model corresponds to such a position obtained by internally dividing the same target bone by the same predetermined ratio in the skeleton model of the enemy character. As a consequence, the predetermined portion of the enemy character which is attacked becomes the same position as a predetermined position of a body in the second base skeleton model in the motion.

Also, the specific motion is corrected by performing the inverse kinematics process operation in accordance with the below-mentioned manner. That is to say, a position of a first standard mode model is changed based upon the acquired relative positional relationship every interpolation frame. The changed position of the first standard mode model is corrected by the interpolation ratio of this interpolation frame, and then, the skeleton model is arranged at this corrected position of the first standard model.

Furthermore, while the motion data used to make the predetermined portion of the first base skeleton model in contact with the predetermined portion of the second base skeleton model are previously prepared in correspondence with the respective motions, when the specific motion is determined, the motion data corresponding to this determined specific motion is acquired. The motion data made by the base skeleton model may be used to various characters.

Various Modifications

As apparent from the foregoing descriptions, the present invention is not limited to the above-described preferred embodiments, but may be modified, changed, and substituted without departing from the technical scope and spirit of the present invention. For example, the above-described embodiments describe such an example that the human type skeleton models are employed in correspondence with the human type characters. Alternatively, an animal type skeleton model may be employed in correspondence with an animal type character. Also, the sort of motion is designated by manipulating the joystick 161a. Alternatively, the sort of motion may be designated by manipulating the button provided on the keypad 161. Also, this embodiment describes the correction of the motion in the case that the own character attacks the enemy character. Alternatively, a similar motion correction may be carried out with respect to the motion of the enemy character. Since the correction of the motion according to this embodiment is applied to the enemy character, the motion between the character of the game player and the enemy character may be commonly used.

Furthermore, in FIG. 5, even in the motion having the same motion number, a total number of interpolation frames can be changed, depending upon the bone. As a result, various types of motion can be defined. Alternatively, while the interpolation ratio defined at the step S21 is changed every group of bones, or the target bone number is switched in a half way, more natural as well as various motion may be represented.

Also, since the arrangement of the home-use game machine 101 shown in FIG. 1 is an example, this home-use game machine 101 may be modified. The communications interface 115 may be arbitrarily provided with this home-use game machine 101. Alternatively, the sound processing unit 109 may not be provided.

On the other hand, since the CD-ROM is one typical example of recording media, various other recording media may be employed, for example, an internal memory such as a ROM; a CD-ROM; a DVD-ROM; a memory cartridge; a floppy disk; a magnetic disk; and a DVD-RAM. In such an alternative case, the CD-ROM drive 113 is required to be replaced by a proper media drive suitable for the relevant recording media.

In the above-explained embodiment, the invention idea of the present invention is realized by employing the computer program. Alternatively, the inventive idea may be realized by combining a computer program with an exclusively-used apparatus such as an electronic circuit, or by employing only such an exclusively-used apparatus such as an electronic circuit.

While the present invention has been described in detail with reference to the embodiment, the present invention is not limited to the above-described preferred embodiment, but may be modified, changed, and substituted without departing from the technical scope and spirit of the present invention. For example, the above-described embodiment describes such a case that while the home-use game machine is used as the platform, the present invention is realized. Alternatively, the present invention may be realized, while the normal computer, an arcade game machine, and the like are used as the platform. Furthermore, while a portable information terminal, a car navigation system, and the like are used as the platform, the present invention may be realized.

It should also be noted that both the computer program and the data used to realize the present invention are not limited only to such modes provided by way of a recording medium such as a CD-ROM, which is detachably mounted on a computer and a game machine. In other words, another mode may be utilized. While the program and the data used to realize the present invention are stored into a memory employed in another electronic appliance which is connected via the communications interface 115 and the communications medium 141 (see FIG. 1) to the network 151, both the program and the data may be sequentially saved into the RAM 105 via the communications line 141, if required, and then, may be used.

Various Display Modes

FIG. 19, FIG. 20, FIG. 21, and FIG. 22 illustratively show a case of a fighting game to which this embodiment has been applied. In this case, a display scene 120 is illustrated in which the following motion is carried out. That is, both hands of a small-sized wrestler 900 grasp a head of a large-sized wrestler 800. It should be understood that since the ground is a flat surface, there is no height difference between a position where the wrestler 900 stands and a position where the wrestler 800 stands.

Figure 19:
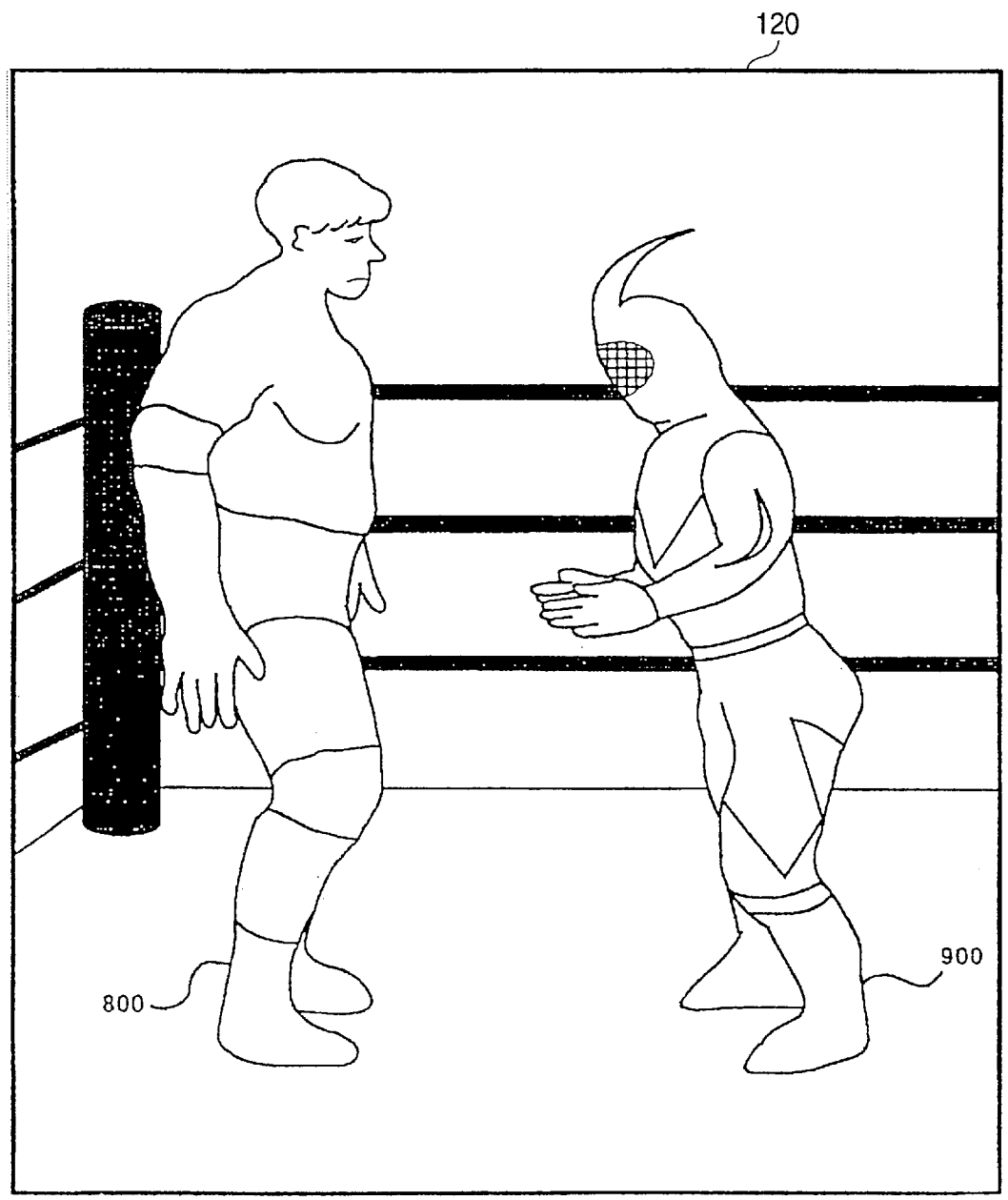
FIG. 19 illustratively shows a first display screen example when the computer readable program of this embodiment is used.
Figure 20:
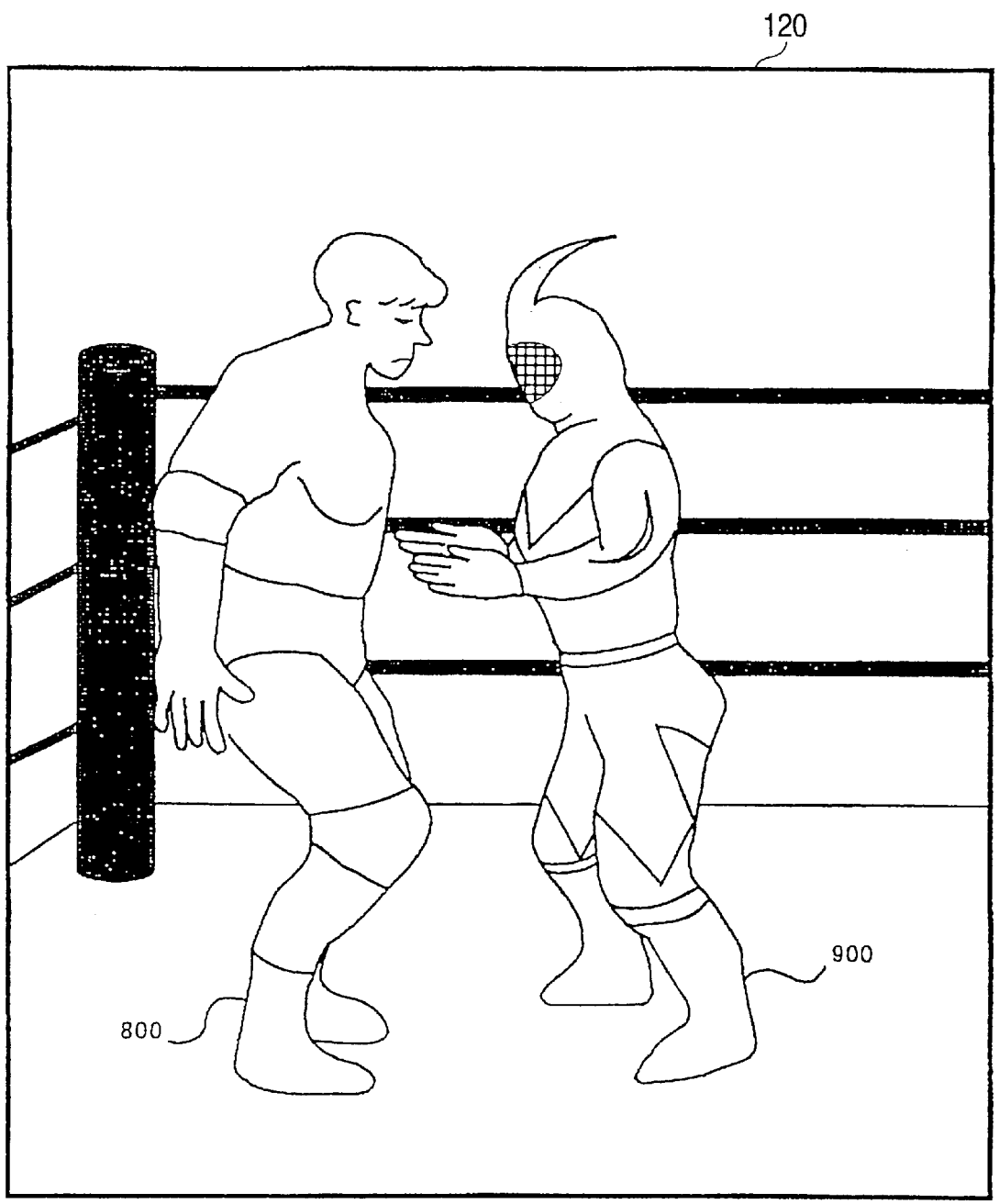
FIG. 20 illustratively shows a second display screen example when the computer readable program of this embodiment is used.

In FIG. 19, as a first motion operation, the wrestler 900 starts to lift up both arms. A small space is made between the wrestler 900 and the wrestler 800. In FIG. 20, while the body attitude of this wrestler 900 is not essentially changed, this wrestler 900 approaches the wrestler 800, and also lifts up the arms higher than those shown in FIG. 19. As in this case, when the height of the wrestler 800 is much larger than the height of the wrestler 900, if the wrestler 800 is directly standing, then the hands of the small-sized wrestler 800 cannot reach the large-sized wrestler 900 having such a tall height and a long arm. As a result, in this case, the head height of the wrestler 800 is lowered by slightly bending the knee.

Figure 21:
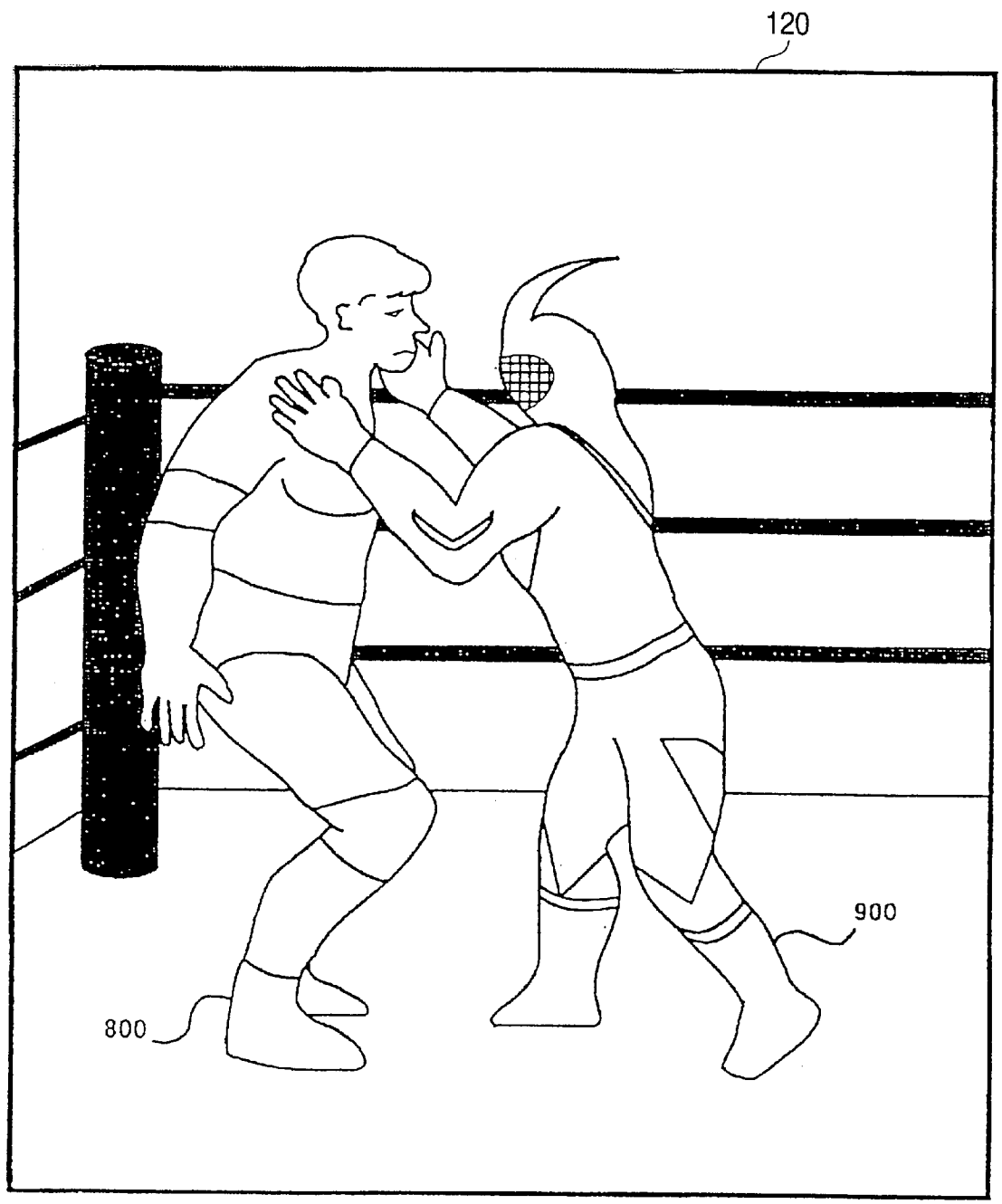
FIG. 21 illustratively shows a third display screen example when the computer readable program of this embodiment is used.
Figure 22:
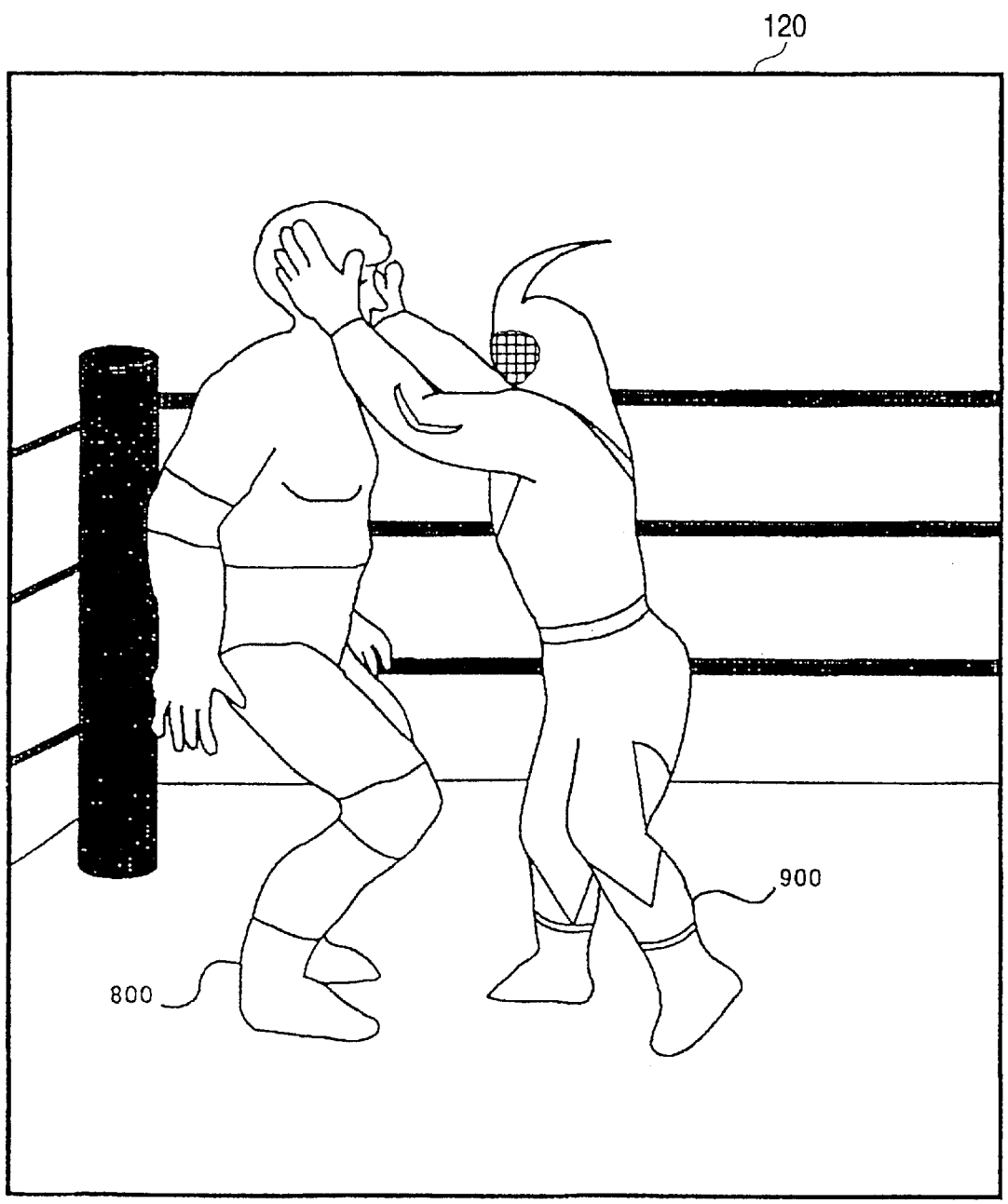
FIG. 22 illustratively shows a fourth display screen example when the computer readable program of this embodiment is used.

As seen in FIG. 21, both hands of the wrestler 900 are further lifted up to approach an area defined from the shoulder to the face of the wrestler 800. The body attitude of the wrestler 900 is slightly bent along the forward direction. Conversely, the body attitude of the wrestler 800 is slightly raised up. As indicated in FIG. 22, both hands of the wrestler 900 reach the head of the wrestler 800, which is located at a higher position than the head position of the wrestler 900 himself. The attitude of the wrestler 900 is also changed into such a standing attitude in order that both hands of this wrestler 90 can reach such a higher position from the forward bending attitude. On the other hand, the attitude of the wrestler 800 is changed into such an attitude that this wrestler 800 slightly bends his knees.

As previously explained in detail, when the present embodiment is applied to such a fighting game, even when there is a physique difference between wrestlers, more natural motion can be displayed.

As previously described in detail, in accordance with the present invention, such a motion correcting technique can be provided, taking account of the physique difference among the characters, while this motion is instructed by the operation input made by the game player.

What is claimed is:

1. A computer readable recording medium for recording thereon a computer program capable of displaying motion of a first character in a virtual space, wherein:

said computer program causes said computer to:
determine motion so that a predetermined portion of said first character is moved toward a predetermined portion of a standard mode model in response to an operation input of a player, a second character corresponding with the standard mode model comprising portions corresponding with respective portions of said second character;
acquire a positional relationship between the predetermined portion of the standard mode model, which is a target of said determined motion, and a portion of the second character corresponding to said predetermined portion of the standard mode model;
correct said determined motion by employing said acquired positional relationship; and
display on a screen, said first character which is moved in accordance with said corrected motion.

2. A computer readable recording medium as claimed in claim 1 wherein:

while said determined motion is corrected, a position of the predetermined portion of said first character is gradually corrected until a correction amount of the position of the predetermined portion of said first character becomes an amount defined in response to said acquired positional relationship.

3. A computer readable recording medium for recording thereon a program capable of displaying motion of a first character in a virtual space, wherein:

said computer program causes said computer to:
determine motion so that a predetermined portion of a first standard mode model contacts a predetermined portion of a second standard mode model in response to an operation input of a player, while said first standard mode model is defined in correspondence with said first character and also has a same attitude as said first character; and said second standard mode model is defined in correspondence with a second character and also has a same attitude as the second character;
acquire a relative positional relationship between the predetermined portion of said second standard mode model and a corresponding predetermined portion in said second character;
acquire a relative positional relationship between the predetermined portion of the first standard mode model and a corresponding predetermined portion in the first character;
correct said determined motion by using said acquired relative positional relationships; and
display a scene where motion is carried out by causing said first character to execute said corrected motion so that the predetermined portion of said first character, which corresponds to the predetermined portion of said first standard mode model, contacts the predetermined portion of said second character, which corresponds to the predetermined portion of said second standard mode model.

4. A computer readable recording medium as claimed in claim 3 wherein:

both said first standard mode model and said second standard mode model are equal to a first standard-sized skeleton model and a second standard-sized skeleton model, respectively;

the predetermined portion of said second standard mode model is equal to a position obtained by internally dividing a preselected bone in said second skeleton model by a predetermined ratio; and the predetermined portion of said second character, which corresponds to the predetermined portion of said second standard mode model, is equal to a position obtained by internally dividing a bone in said second character, which is identical to said predetermined bone of said second skeleton model by the same predetermined ratio as that of said second skeleton model.

5. A computer readable recording medium as claimed in claim 3 wherein:

the correction of said determined motion is carried out by executing an inverse kinematics process operation in such a manner that the position of the predetermined portion of said first standard mode model is changed based upon said acquired relative positional relationships, and the predetermined portion of said first character is arranged to said changed position.

6. A computer readable recording medium as claimed in claim 3 wherein:

the correction of said determined motion is carried out by executing an inverse kinematics process operation in such a manner that the position of the predetermined portion of said first standard mode model is corrected every interpolation frame based upon said acquired relative positional relationships by an interpolation ratio of said interpolation frame, and the predetermined portion of said first character is arranged to said corrected position.

7. A computer readable recording medium as claimed in claim 3 wherein:

motion data used to make the predetermined portion of said first standard mode model contact the predetermined portion of said second standard mode model are previously prepared in correspondence with each of said motion; and when the motion is determined, the corresponding motion data is acquired.

8. A computer readable recording medium for recording thereon a program of a professional wrestling game capable of controlling motion of a wrestler, wherein:

said computer program causes said computer to:

display a motion that a first wrestler grasps a predetermined portion of a second wrestler, while judging a shift amount between a reach point of a position of a hand owned by said first wrestler in said grasping motion and said predetermined portion of said second wrestler in response to data indicative of physique previously defined in correspondence with said second wrestler;

correct the position of the hand owned by said first wrestler in the grasping motion in response to said judged shift amount; and display a grasping operation that said first wrestler grasps said predetermined portion of said second wrestler based upon said corrected motion.

9. A method for displaying motion of a first character in a virtual space, comprising:

determining motion so that a predetermined portion of said first character moves toward a predetermined portion of a standard mode model in response to an operation input of a player, a second character corresponding with the standard mode model comprising portions corresponding with respective portions of said second character;

acquiring a positional relationship between the predetermined portion of the standard mode model, which is a target of said determined motion, and a portion of the second character corresponding to said predetermined portion of the standard mode model;

correcting said determined motion by employing said acquired positional relationship; and displaying on a screen, said first character which is moved in accordance with said corrected motion.

10. A display method as claimed in claim 9 wherein:

while said determined motion is corrected, the position of a predetermined portion of said first character is gradually corrected until a correction amount of the position of the predetermined portion of said first character becomes an amount defined in response to said acquired positional relationship.

11. A method for displaying motion of a first character in a virtual space, comprising:

determining motion so that a predetermined portion of a first standard mode model contacts a predetermined portion of a second standard mode model in response to an operation input of a player, while said first standard mode model is defined in correspondence with the first character and also has a same attitude as said first character, and said second standard mode model is defined in correspondence with a second character and also has a same attitude as the second character;

acquiring a relative positional relationship between the predetermined portion of said second standard mode model and a corresponding predetermined portion in said second character;

acquiring a relative positional relationship between the predetermined portion of said first standard mode model and a corresponding predetermined portion in said first character;

correcting said determined motion by using said acquired relative positional relationships; and displaying a scene where motion is carried out by causing said first character to execute said corrected motion so that a preselected portion of said first character, which corresponds to the predetermined portion of said first standard mode model, contacts a preselected portion of said second character, which corresponds to the predetermined portion of said second standard mode model.

12. A display method as claimed in claim 11 wherein:

both said first standard mode model and said second standard mode model are equal to a first standard-sized skeleton model and a second standard-sized skeleton model, respectively;

the predetermined portion of said second standard mode model is equal to a position obtained by internally dividing a preselected bone in said second skeleton model by a predetermined ratio; and the predetermined portion of said second character, which corresponds to the predetermined portion of said second standard mode model, is equal to a position obtained by internally dividing a bone in said second character, which is identical to said predetermined bone of said second skeleton model by the same predetermined ratio as that of said second skeleton model.

13. A display method as claimed in claim 11 wherein:

the correction of said determined motion is carried out by executing an inverse kinematics process operation in such a manner that the position of the predetermined portion of said first standard mode model is changed based upon said acquired relative positional relationships, and the predetermined portion of said first character is arranged to said changed position.

14. A display method as claimed in claim 11 wherein:

the correction of said determined motion is carried out by executing an inverse kinematics process operation in such a manner that the position of the predetermined portion of said first standard mode model is corrected every interpolation frame based upon said acquired relative positional relationships by an interpolation ratio of said interpolation frame, and the predetermined portion of said first character is arranged to said corrected position.

15. The method as claimed in claim 11 wherein:

motion data used to make the predetermined portion of said first standard mode model contact the predetermined portion of said second standard mode model are previously prepared in correspondence with each motion; and when the motion is determined, the corresponding motion data is acquired.

16. A professional wrestling game processing method for controlling motion of wrestlers, comprising:

displaying a motion that a first wrestler grasps a predetermined portion of a second wrestler, while judging a shift amount between a reach point of a position of a hand owned by said first wrestler in said grasping motion and said predetermined portion of said second wrestler in response to data indicative of physique previously defined in correspondence with said second wrestler;

correcting the position of the hand owned by said first wrestler in the grasping motion in response to said judged shift amount; and displaying a grasping operation that said first wrestler grasps said predetermined portion of said second wrestler based upon said corrected motion.

17. A game apparatus for displaying motion of a first character in a virtual space, comprising:

a unit for executing a game in accordance with a program;

a memory for storing at least a portion of said program; and a display screen for displaying the game executed by said unit; wherein:

in accordance with said program stored in said memory, said unit:

determines motion so that a predetermined portion of said first character is moved toward a predetermined portion of a standard mode model in response to an operation input of a player, a second character corresponding with the standard mode model comprising portions corresponding with respective portions of said second character;

acquires a positional relationship between the predetermined portion of the standard mode model, which is a target of said determined motion, and a portion of the second character corresponding to said predetermined portion of the standard mode model;

corrects said determined motion by employing said acquired positional relationship; and displays on the display screen, said first character which is moved in accordance with said corrected motion.

18. A game apparatus as claimed in claim 17 wherein:

while said determined motion is corrected, a position of the predetermined portion of said first character is gradually corrected until a correction amount of the position of the predetermined portion of said first character becomes an amount defined in response to said acquired positional relationship.

19. A game apparatus for displaying motion of a first character in a virtual space, comprising:

a unit for executing a game in accordance with a program;

a memory for storing at least a portion of said program; and a display screen for displaying thereon the game executed by said unit; wherein:

in accordance with said program stored in said memory, said unit:

determines motion so that a predetermined portion of the first standard mode model contacts a predetermined portion of a second standard mode model in response to an operation input of a player, while said first standard mode model is defined in correspondence with said first character and also has a same attitude as said first character; and said second standard mode model is defined in correspondence with a second character and also has a same attitude as the second character;

acquires a relative positional relationship between the predetermined portion of said second standard mode model and a corresponding predetermined portion in said second character;

acquires a relative positional relationship between the predetermined portion of said first standard mode model and a corresponding predetermined portion in said first character;

corrects said determined motion by using said acquired relative positional relationships; and displays a scene where motion is carried out by causing said first character to execute said corrected motion so that a preselected portion of said first character, which corresponds to the predetermined portion of said first standard mode model, contacts a preselected portion of said second character, which corresponds to the predetermined portion of said second standard mode model.

20. A game apparatus for controlling motion of wrestlers, comprising:

a unit for executing a game in accordance with a program;

a memory for storing at least a portion of said program; and a display screen for displaying the game executed by said unit; wherein:

in response to the program stored in said memory, said unit:

displays a motion showing a first wrestler grasping a predetermined portion of a second wrestler, while judging a shift amount between a reach point of a position of a hand owned by said first wrestler in said grasping motion and said predetermined portion of said second wrestler in response to data indicative of physique previously defined in correspondence with said second wrestler;

corrects the position of the hand owned by said first wrestler in the grasping motion in response to said judged shift amount; and displays a grasping operation in which the first wrestler grasps said predetermined portion of said second wrestler based upon said corrected motion.

21. A program used to display motion of a first character in a virtual space, wherein:

said program causes a computer to:

determine motion so that a predetermined portion of said first character is moved toward a predetermined portion of a standard mode model in response to an operation input of a player, a second character corresponding with the standard mode model comprising portions having a correspondence relationship with the respective portions of said second character;

acquire a positional relationship between the predetermined portion of the standard mode model, which is a target of said determined motion, and a portion of the second character corresponding to said preselected portion of the standard mode model;

correct said determined motion by employing said acquired positional relationship; and display on a screen, said first character which is moved in accordance with said corrected motion.

22. A program as claimed in claim 21 wherein:

while said determined motion is corrected, a position of the predetermined portion of said first character is gradually corrected until a correction amount of the position of the predetermined portion of said first character becomes an amount defined in response to said acquired positional relationship.

23. A program used to display motion of a first character in a virtual space, wherein:

said program causes a computer to:

determine motion so that a predetermined portion of a first standard mode model contacts a predetermined portion of a second standard mode model in response to an operation input of a player, while said first standard mode model is defined in correspondence with said first character and also has a same attitude as the first character; and said second standard mode model is defined in correspondence with a second character and also has same attitude as the second character;

acquire a relative positional relationship between the predetermined portion of said first standard mode model and a corresponding predetermined portion in said first character;

acquire a relative positional relationship between the predetermined portion of said second standard mode model and a corresponding predetermined portion in said second character;

correct said determined motion by using said acquired relative positional relationships; and display a scene where motion is carried out by causing said first character to execute said corrected motion so that a preselected portion of said first character, which corresponds to the predetermined portion of said first standard mode model, contacts a preselected portion of said second character, which corresponds to the predetermined portion of said second standard mode model.

24. A professional wrestling game program for controlling motion of wrestlers, wherein:

said professional wrestling game program causes a computer to:

display a motion that a first wrestler grasps a predetermined portion of a second wrestler, while judging a shift amount between a reach point of a position of a hand owned by said first wrestler in said grasping motion and said predetermined portion of said second wrestler in response to data indicative of physique previously defined in correspondence with said second wrestler;

correct the position of the hand owned by said first wrestler in the grasping motion in response to said judged shift amount; and display a grasping operation that said first wrestler grasps said predetermined portion of said second wrestler based upon said corrected motion.

* * * * *